United States Patent [19]

Porter

[11] Patent Number: 4,829,576

[45] Date of Patent: May 9, 1989

[54] VOICE RECOGNITION SYSTEM

[75] Inventor: Edward W. Porter, Boston, Mass.

[73] Assignee: Dragon Systems, Inc., Newton, Mass.

[21] Appl. No.: 921,625

[22] Filed: Oct. 21, 1986

[51] Int. Cl.$^4$ ................................................ G10L 5/00
[52] U.S. Cl. .................................... 381/43; 364/513.5;
381/44; 381/45
[58] Field of Search ........................ 381/41, 42, 43, 44,
381/45, 46; 364/513.5, 419, 513

[56] References Cited

U.S. PATENT DOCUMENTS

| | | | |
|---|---|---|---|
| 3,883,850 | 5/1975 | Martin et al. .......................... | 381/43 |
| 4,069,393 | 1/1978 | Martin et al. .......................... | 381/43 |
| 4,158,750 | 6/1979 | Sakoe et al. ........................... | 381/43 |
| 4,363,102 | 12/1982 | Holmgren et al. ..................... | 381/42 |
| 4,569,026 | 2/1986 | Best ....................................... | 364/521 |
| 4,624,009 | 11/1986 | Glenn et al. ........................... | 381/43 |
| 4,720,802 | 1/1988 | Damoulakis et al. ............ | 364/513.5 |

Primary Examiner—William M. Shoop, Jr.
Assistant Examiner—Brian Young
Attorney, Agent, or Firm—Edward W. Porter

[57] ABSTRACT

A text locating system recognizes spoken utterances, uses the recognized words as a search string, and searches text for words matching that search string. The probability that a given vocabulary word is selected as a search word is altered both by limiting the recognizable vocabulary to words in the text to the searched, and by altering the probability that individual recognizable words will be selected as a function of the number of time they occur in that text. The system performs incremental searches by adding successively recognized words to the search string and searching for the next occurrence of the string in response to each such addition. The invention can be used in a text editing system which enables a user to switch between a dictation mode, which inserts recognized words into text, and a search mode, which uses them to search for new cursor locations. Broadly speaking, the invention provides a computer system which recognizes spoken words, which has a data structure representing words; which uses that data structure for a purpose other than speech recognition; and which alters the probability that a given vocabulary word will be recognized as a function of the frequency of that word in the data structure.

28 Claims, 24 Drawing Sheets

CURRENT WORD CANDIDATE

| | $W_1$ | $W_2$ | $W_3$ | $W_4$ | $W_5$ | $\cdots$ | $W_n$ |
|---|---|---|---|---|---|---|---|
| $W_0$ | $LS_{01}$ | $LS_{02}$ | $LS_{03}$ | $LS_{04}$ | $LS_{04}$ | | $LS_{0n}$ |
| $W_1$ | $LS_{11}$ | $LS_{12}$ | $LS_{13}$ | $LS_{14}$ | $LS_{15}$ | | $LS_{1n}$ |
| $W_2$ | $LS_{21}$ | $LS_{22}$ | $LS_{23}$ | $LS_{24}$ | $LS_{25}$ | | $LS_{2n}$ |
| $W_3$ | $LS_{31}$ | $LS_{32}$ | $LS_{33}$ | $LS_{34}$ | $LS_{35}$ | | $LS_{3n}$ |
| $W_4$ | $LS_{41}$ | $LS_{42}$ | $LS_{43}$ | $LS_{44}$ | $LS_{45}$ | | $LS_{4n}$ |
| $W_5$ | $LS_{51}$ | $LS_{52}$ | $LS_{53}$ | $LS_{54}$ | $LS_{55}$ | | $LS_{5n}$ |
| $\vdots$ | | | | | | | |
| $W_n$ | $LS_{n1}$ | $LS_{n2}$ | $LS_{n3}$ | $LS_{n4}$ | $LS_{n5}$ | | $LS_{nn}$ |
| $W_{SC}$ | $LS_{SC1}$ | $LS_{SC2}$ | $LS_{SC3}$ | $LS_{SC4}$ | $LS_{SC5}$ | | $LS_{SCn}$ |

PREVIOUS WORD

```
                                                            ┌─ 307
            ┌──────────────────────────────────────────────┐
            │ recognition for vocabularies of up to two    │
            │ thousand words at at any one time, and many of│
            │ its features are described in U. S. patent   │
            │ application serial number 797,249, entitled  │
            │ ┌──────────────────────────┐                 │
            │ │Speech Recognition Apparatus│ and Method",  │
            │ └──────────────────────────┘                 │
            │ which is assigned to the assignee of the     │
            │ present application, and which is            │
            │ incorporated herein by reference.            │
            │ A major problem in the recognition           │
            │ of speech is that of reducing the tremendous │
            ├──────────────────────────────────────────────┤
     308 ──── SEARCH: SPEECH RECOGNITION APPARATUS         │
     318 ──── SEARCH STRING UNIQUELY IDENTIFIES MATCHING TEXT│
            └──────────────────────────────────────────────┘
```

FIG. 36

```
              312A     534
                \       \                                   ┌─ 307
            ┌──────────────────────────────────────────────┐
            │ Due\to recent│advances in computer technology │
            │ and ┌─────────────────┐ algorithms           │
            │     │speech recognition│                     │
            │ speech recognition machines have begun       │
            │ appear in the past several decades, and have │
            │ become increasingly more powerful and less   │
            │ expensive. For example, the assignee of the  │
            │ present application, DRAGON SYSTEMS, INC. has│
            │ publicly demonstrated speech recognition     │
            │ softw┌──────────────┐popular personal        │
            │      │ OR  SELECT   │                 ── 398 │
            │ compu│ 1. apparatuses│uires little extra     │
            │      └──────────────┘                        │
            ├──────────────────────────────────────────────┤
     308 ──── SEARCH: SPEECH RECOGNITION                   │
     318 ──── SAY ANOTHER WORD TO BE SEARCHED FOR          │
            └──────────────────────────────────────────────┘
```

FIG. 37

VOICE RECOGNITION SYSTEM

FIELD OF THE INVENTION

The present invention relates to speech recognition in general, including, without limitation, speech recognition systems which recognize commands, such as commands for use with a text editor.

BACKGROUND OF THE INVENTION

There has long been a desire to have machines capable of responding to human speech, such as machines capable of obeying human commands and machines capable of transcribing human dictation. Such machines would greatly increase the speed and ease with which people communicate with computers and with which they record and organize their words and thoughts.

Due to recent advances in computer technology and speech recognition algorithms, speech recognition machines have begun to appear in the past several decades, and have become increasingly more powerful and less expensive. For example, the assignee of the present application has publicly demonstrated speech recognition software which runs on popular personal computers and which requires little extra hardware. This system is capable of providing speaker dependent, discrete word recognition for vocabularies of up to two thousand words at any one time, and many of its features are described in U.S. patent application Ser. No. 797,249, entitled "Speech Recognition Apparatus and Method", which is assigned to the assignee of the present application, and which is incorporated herein by reference.

Advances of the type currently being made by the assignee of the present application and other leaders in the speech recognition field will make it possible to bring large vocabulary speech recognition systems to the market. Such systems will be able to recognized a large majority of the words which are used in normal dictation, and thus they will be well suited for the automatic transcription of such dictation. But to achieve their full usefulness such voice recognition dictation machines should be able to perform editing functions as well as the straight forward entry of text, and they should be able to perform such functions in a way that is easy and natural for the user.

Voice recognition has been used as a way of controlling computer programs in the past. But current voice recognition systems are usually far from foolproof, and the likelihood of their misrecognizing a word tends to increase as does the size of the vocabulary against which utterances to be recognized are compared. For this reason, and to reduce the amount of computation required for recognition, many speech recognition systems operate with precompiled artificial grammars. Such an artificial grammer associates a separate sub-vocabulary with each of a plurality of grammer states; provides rules for determining which grammer states the system is currently in, and allows only words from the sub-vocabulary associated with the current machine state to be recognized.

Such precompiled artificial grammars are not suitable for normal dictation, because they do not allow users the freedom of word choice required for normal dictation. But such artificial grammars can be used for commanding many computer programs which only allow the user to enter a limited number of previously known commands at any one time. There are, however, many computer command for which such precompiled artificial grammars are not applicable because they allow the user to enter words which are not limited to a small predefined vocabulary. For example, computer systems commonly refer to, or perform functions on, data contained in changeable data structures of various types, such as text files, data base files, file directories, tables of data in memory, or menus of choices currently available to a user. Artificial grammars are often insufficient for computer commands which name an element contained in such a data structure, because the vocabulary required to name the elements in such data structures is often not known in advance.

SUMMARY OF THE INVENTION

It is an object of the present invention to provide speech recognition systems which improve the ease with which humans can control computer systems.

In particular, it is the object of present invention to provide speech recognition systems for improving the ease and reliability with which humans can control computer systems which deal with elements contained in data structures, such as words in a text file or names in a data Base.

In another object of the present invention to provide a speech recognition system that provides an improved method of moving in and editing text.

According to one aspect of the present invention, a text locating system is provided which includes a means for representing a body of text, means for storing an acoustic description of each of a plurality of vocabulary words, and means for receiving an acoustic description of utterances to be recognized. The system further includes recognition means for comparing the acoustic description of utterances to be recognized against the acoustic descriptions of vocabulary words so as to select which of the vocabulary words most probably correspond to the utterances. The system further includes means for receiving vocabulary words which have been recongized by the recognition means and creating a search string out of them, and means for searching a portion of the text for a sequence of words matching the search string.

Preferably, this text locating system includes a visual display which displays the text which matches the search string. Furthermore, it is preferred that the system includes means for altering the probability that the recognition means will select a given vocabulary word as corresponding to an utterance to be recognized as a function of the frequency of the occurence of that vocabulary word in the portion of text to be searched. Preferably this substantially limits the vocabulary of recognizable words to words contained in the text being searched, and alters the probability that each word in the recognition vocabulary will be selected as the recognized word as a function of the number of times that word has occurred in the text to be searched.

Preferably the system is capable of searching for text matching the search string after each of a succession of recognized word is added to it, and indicates to the user when the search string uniquely defines a location in the text being searched. It is also preferred that the text locating system be used in conjunction with a text processing system which performs editing functions on a body of text. Preferrably the text locating system can move the cursor of such a system. It is also preferred that the system enable a user to perform editing functions on the block of text which match the search string.

According to another aspect of the present invention, a computer system is provided which includes means for storing an acoustic description of each of a plurality of vocabulary words, and means for receiving an acoustic description of one or more utterances to be recognized. The system further includes means for comparing the acoustic descriptions of utterances to be recognized against the acoustic descriptions of vocabulary words, so as to select which of the vocabulary words most probably correspond to the utterances. The system further comprises a data structure representing one or more words and means for using that data structure for a purpose independent of indicating the probability that individual vocabulary words will be recognized. The system also includes means for determining which vocabulary words are represented in the data structure and for using that determination to alter the probability that each of the vocabulary words will be selected as corresponding to a given utterance.

Preferably the system substantially limits its recognition vocabulary to words represented in the data structure. In certain embodiments, the system also alters the probability that a word in its recognition vocabulary will be recognized according to the number of times which the word has been represented in the data structure. The data structure can be a disk-directory, a menu of user selectable choices, a body of text, the system's screen memory, or any other type of data structure.

DESCRIPTION OF THE DRAWINGS

These and other aspects of the present invention will become more evident upon reading the following description of the preferred embodiment in conjunction with accompanying drawings, in which:

FIGS. 9-11 are schematic block diagrams of each of the three modes of operation which the interrupt subroutines of FIGS. 5-8 cause the preferred embodiment to operate in;

FIG. 15 is a schematic representation of the language model used with the preferred embodiment of the present invention;

FIG. 36 is a schematic representation of a video display screen after the system has found a sequence of three words matching a three word search string;

FIG. 37 is a schematic representation of the screen of the video display after the user has instructed the system to disregard the last word of the three word search string;

DETAILED DESCRIPTION OF PREFERRED EMBODIMENTS

Figure 1:
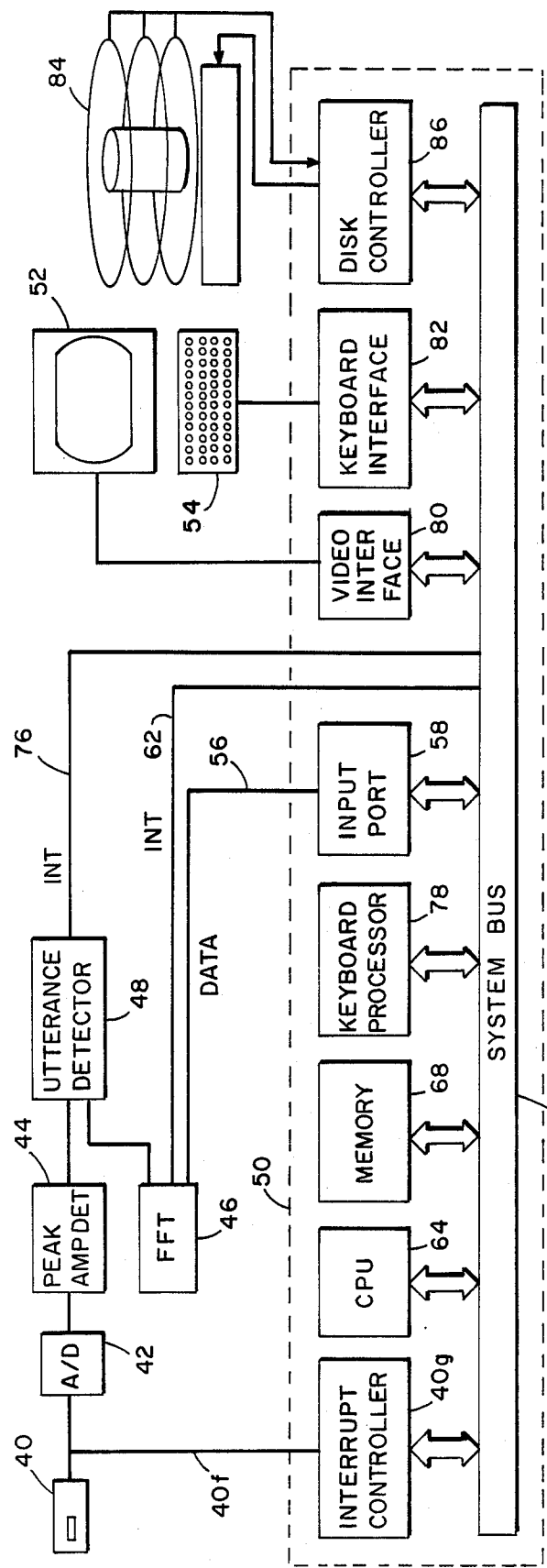
FIG. 1 is a schematic block diagram of the basic hardware components used in the preferred embodiment of the present invention.

Referring now to FIG. 1, a schematic representation is made of the electronic hardware used with a preferred embodiment of the present invention. This computer hardware is similar to that described in much greater detail in U.S. Pat. Application Ser. No. 797,249 filed by J. K. Baker, et al. on Nov. 12, 1985, which is entitled "Speech Recognition Apparatus and Method" (hereinafter "Application Ser. No. 797,249"). This Application Ser. No. 797,249 is assigned to the assignee of the present application and is incorporated herein by reference. The only distinction between the hardware shown in FIG. 1 of the present application and that in application Ser. No. 797,249 are as follows: (1) the microphone 40 shown in FIG. 1 differs from the microphone 40 shown in the prior application; (2) an interrupt line 40F and interrupt controller 40G are added in FIG. 1, and (3) FIG. 1 shows the addition of a disc drive 84 and a disc controller 86.

With the exception of the likelihood processor 78, the A-D converter 42, the FFT circuit 46 amplitude detector 44 and the utterance detector 48, all of the hardware shown in FIG. 1 occur in most standard personal computers. The likelihood processor 78 is used to compute the statistical likelihood that a given frame of acoustic data 92, shown as a vertical rows of acoustic parameters in FIG. 2, would be generated by the probability distribution represented by each acoustic node 96 of the acoustic model 90 of a vocabulary word. The operation of such a likelihood processor is described in much greater detail in Application Ser. No. 797,294. As is described in that application, the function performed by the hardware likelihood processor can be performed in software in alternate embodiments of the invention.

The A-D converter 42 is used to convert analog signals generated by the microphone 40 into digital signals. The FFT circuit 46 is used to take the time domain digital signal generated by the output of the A-D converter 42 and converted into frequency domain information containing 8 special parameters used to form the individual frames 92 shown in FIG. 2. The peak amplitude detector 44 is used to detect when the amplitude of the signal generated by microphone 40 exceeds a predetermined threshold. Its output is fed to the utterance detector 48, which determines when the signal generated by microphone 40 probably represents the beginning of a spoken utterance. The operation of all these components is described in much greater detail in Application Ser. No. 797,294.

Figure 2:
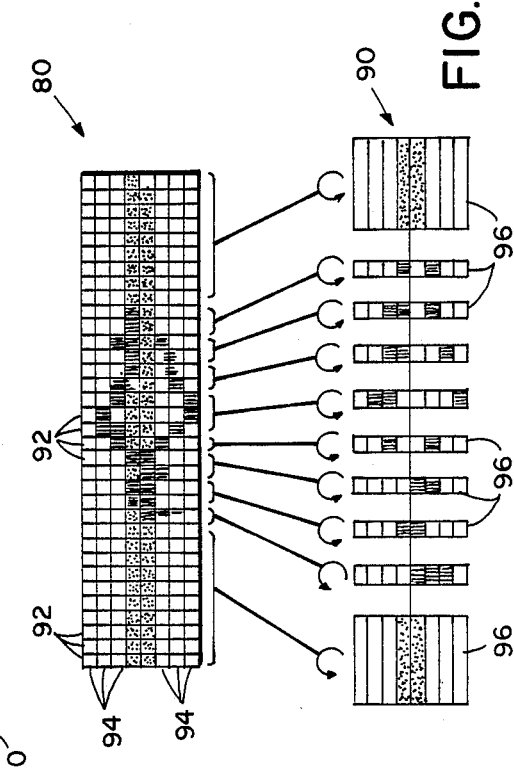
FIG. 2 is a highly schematic representation of how the dynamic programming process of the preferred embodiment compares an acoustic descriptions of an utterance to be recognized against an acoustic description of a vocabulary word.

The preferred embodiment of the present invention uses the speech recognition algorithm described in Application Ser. No. 797,294. Described at a very abstract level, this algorithm compares the acoustic description of an utterance to be recognized, in the form of a sequence 88 of frames 92 of acoustic data, against the acoustic model 90 of each of a plurality of vocabulary word. As is illustrated in FIG. 2, it uses dynamic programming to time align the sequence of frame 88 against each of the models 90 in a way which provides an optimal match between the model for each vocabulary word and the frames of the utterance to be recognized. Each of these optimal matches is given a score, and the word with the best score is considered to correspond to the utterance to be recognized.

Figure 3:
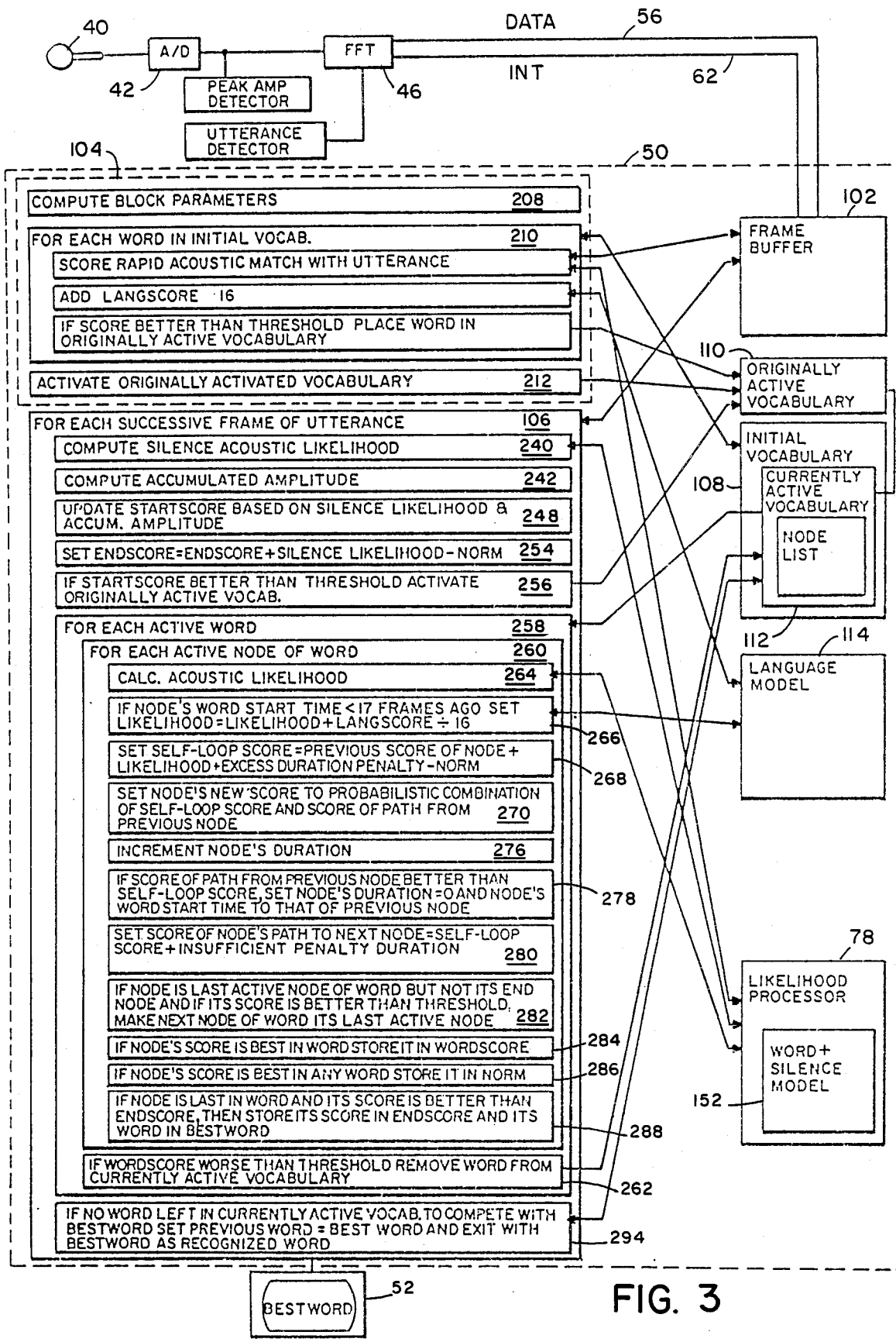
FIG. 3 is a schematic block diagram of the dynamic programming algorithm used to perform speech recognition according to the preferred embodiment.
Figure 8:
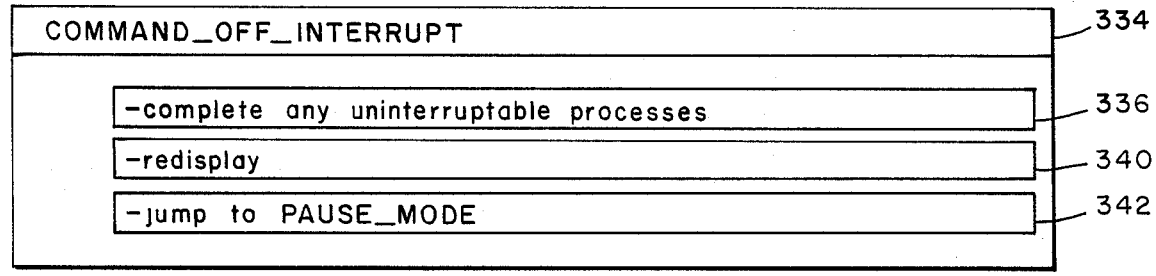

FIG. 3 of the present application corresponds to the FIG. 8 in Application Ser. No. 797,294. Since this FIG. is described in much greater detail in the above-mentioned prior application, it is described only briefly here. According to it, the output of microphone 40 is converted to digital data by the A-D converter 42, and this digital signal is converted into frames of spectral parameters by the FFT circuit 46, and these frames are then stored in a frame buffer 102. The algorithm has two major blocks, block 104, which performs prefiltering, and block 106 which perform a more lengthy matching. The prefiltering of block 104 performs a rapid match of each word in an initial vocabulary against the utterance to be recognized to determine if that word appears enough like the utterance to warrant the more lengthy comparison which is carried out in the Block 106. The Block 106 performs the detailed dynamic programming of the type illustrated schematically in FIG. 2 in response to each successive frame 92 of the utterance to be recognized. The process of block 106 continues for each frame until step 294 determines that the best scoring word has been selected and it produces that word as the output BESTWORD shown at the bottom of the FIG.

Both the prefiltering step 104 and the more lengthy match 106 shown in FIG. 3 produce likelihood scores by comparing spectral models from successive portions of the utterance to be recognized against successive spectral models associated with each of a plurality of vocabulary words. Both of these steps use language scores, referred to as LANGSCORE in steps 210 and 266 of FIG. 3, to alter the acoustic likelihood scores they produce. As is explained in much greater detail in Application Ser. No. 797,294, these language scores are statistically derived from large samples of text, and they reflect the likelihood of their corresponding word occurring in the current linguistic context.

Figure 4:
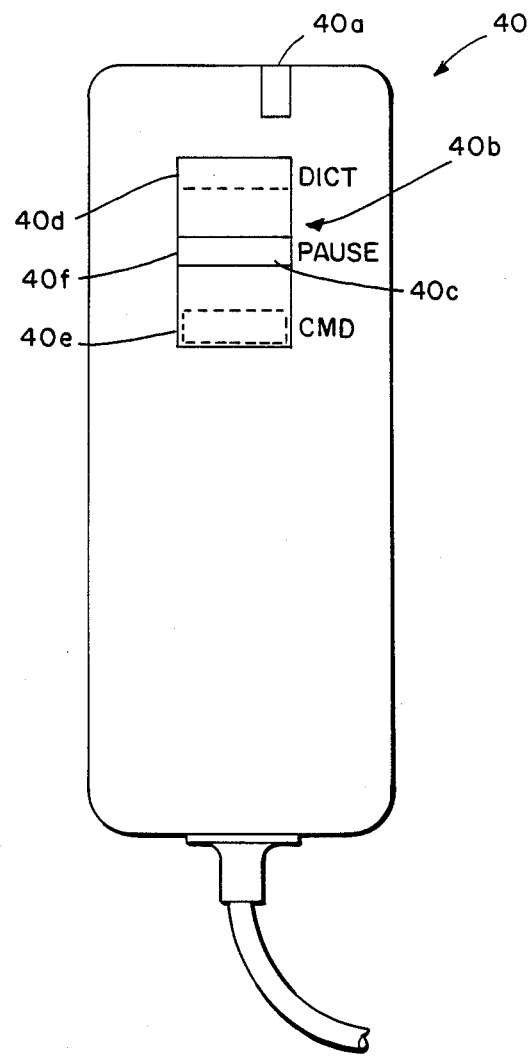
FIG. 4 is a front view of a hand-held microphone used in the preferred embodiment.
Figure 5:
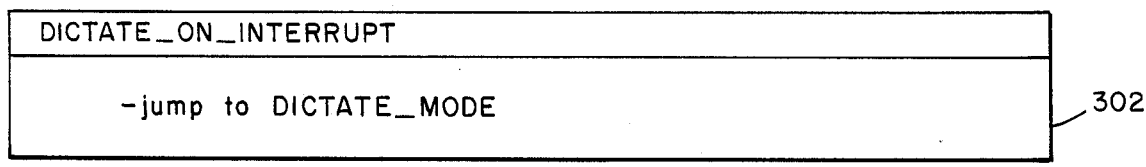
FIGS. 5-8 are schematic block diagrams of subroutines performed in response to the interrupts generated by the switch on the hand-held microphone shown on FIG. 4.

Referring now to FIG. 4, the microphone 40 shown in FIG. 1 is illustrated in greater detail. The hand-held microphone 40 has an opening 40A which includes its actual microphone. In addition, the microphone 40 includes a switch 40B which has a raised portion 40C designed to be slid up into a "dictation" position 40D, down to a "command" position 40E, or to the central, or "pause", position 40F. When the switch 40B is pushed upward into the "dictate" position, a "dictate on" interrupt signal is sent over cable 40F to the interrupt controller 40G which causes the computer 50 to execute the DICTATE_ON_INTERRUPT routine shown in FIG. 5.

Figure 9:
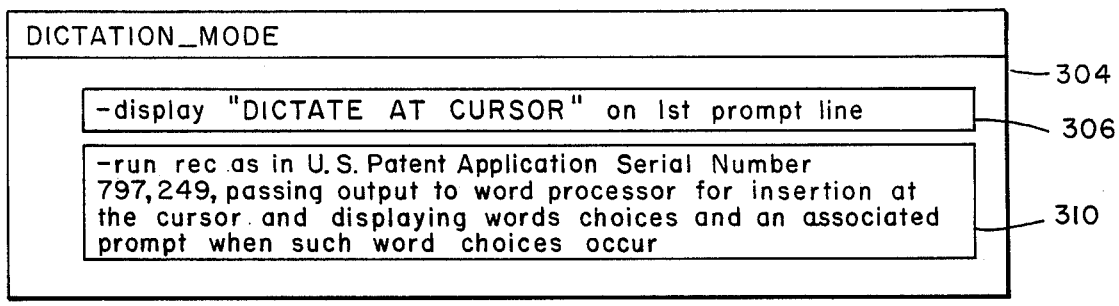
Figure 12:
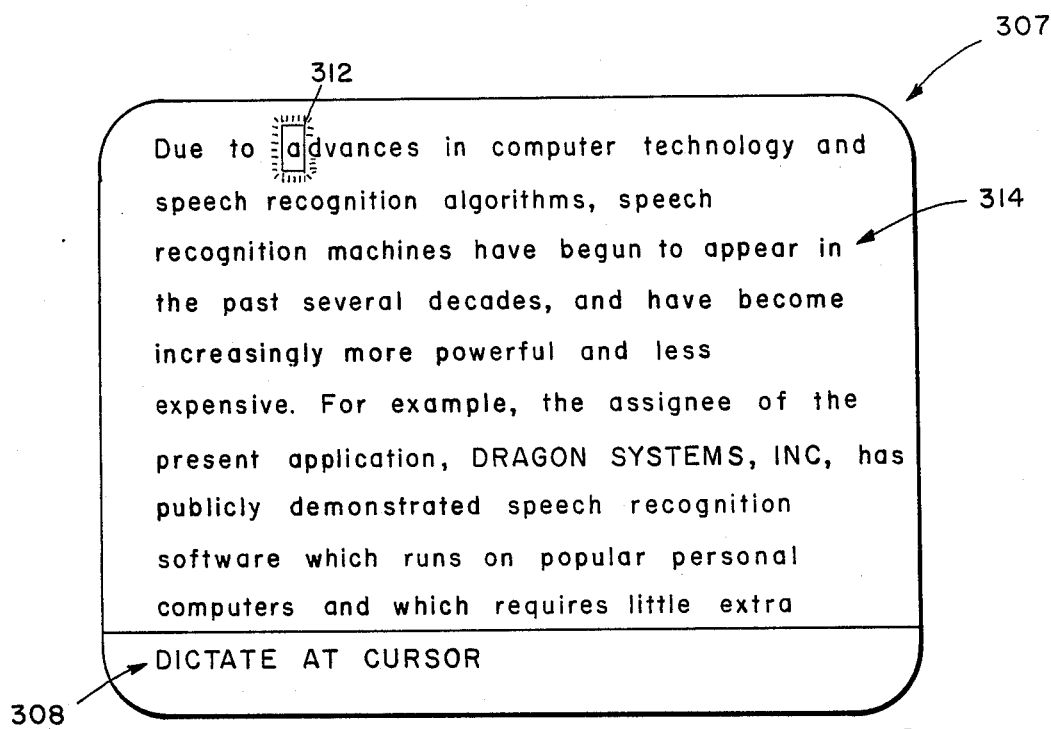
FIGS. 12 and 13 illustrate how the video display screen of the preferred embodiment of the present invention appears during DICTATION_MODE.

This subroutine jumps to the DICTATION_MODE subroutine shown in FIG. 9. This latter subroutine first performs a step 306, which places the prompt "DICTATE AT CURSOR" in the first prompt line 308 of the video display screen 307 shown in FIG. 12. Then step 310 runs the speech recognition of FIG. 3. When it does this, it passes the BESTWORD choice associated with each utterance to a word processor program for insertion in a body of text at a CURSOR, such as the CURSOR 312 shown in FIG. 12.

In the preferred embodiment, the speech recognition algorithm of FIG. 3 is modified in the manner described in Application Ser. No. 797,294, to output not only the best scoring word choice, but also a list of the next best scoring word choices, if those alternate word choices have scores which are close to that of the first word choice. Each of these alternate word choices is displayed upon the screen 307 with a number beside it, so they can be selected by the operator, if the operator intended one of those alternate words rather than the best scoring word.

Figure 13:
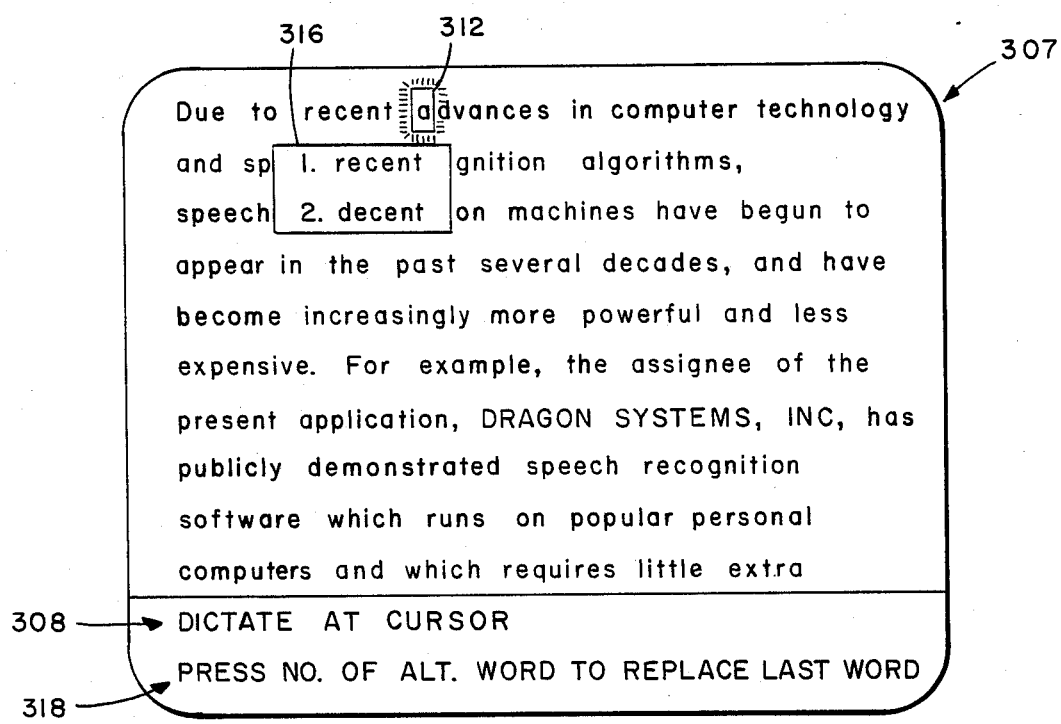

FIG. 13 illustrates this by showing a pop-up alternate word choice display 316. Display 316, which contains two alternate choices, "recent" and "descent", is displayed below the BESTWORD "recent", which has been inserted at the former location of the CURSOR 312 shown is FIG. 12. As is described in Application Ser. No. 797,294, if the speaker speaks another utterance, the system assumes that the best scoring word, in this case "recent", was the word intended by the speaker. If, however, the user types the number associated with an alternate choice word, that alternate choice word will be inserted into the text in place of the best scoring word.

Figure 6:
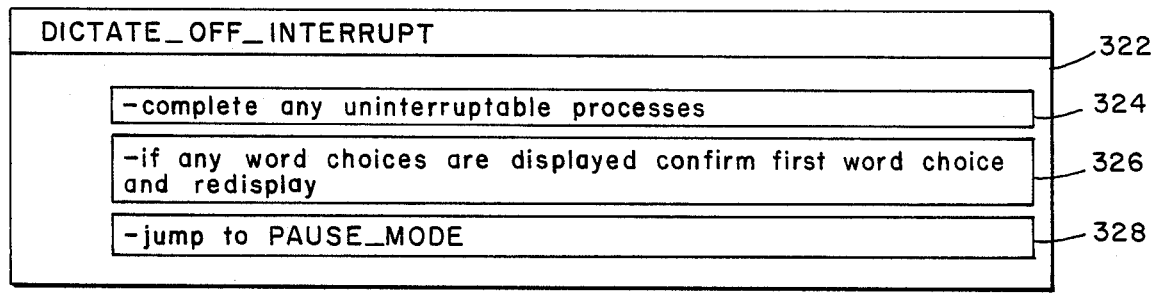
Figure 10:
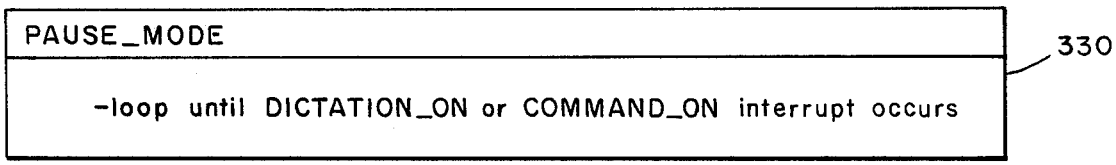

When switch 40B is pushed from its "dictate" position to its "pause" position 40C, a "dictate-off" interrupt signal is generated and transmitted over the cable 40F to the interrupt controller 40G. This causes CPU 64 to execute the DICTATE_OFF_INTERRUPT subroutine 322 shown in FIG. 6. This subroutine, in step 324, complete may uninterruptable processes from the DICTATION_MODE. For example, if the DICTATION_MODE is in the process of writing a word to the screen when the interrupt is generated, step 324 causes the system to complete such a process before the next step takes place. Then in step 326, if any word choices 316 are being displayed, the program confirms the best scoring word and removes the alternate word choices form the screen. Then step 328 causes the program to jump to the PAUSE_MODE shown in FIG. 10. There the program continually loops, doing nothing, except waiting for the next "dictate-on" or "command-on" interrupt to occur.

Figure 7:
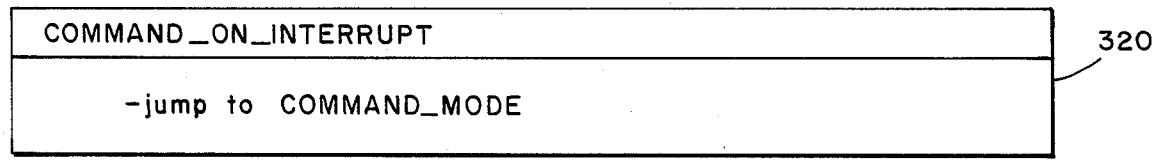

When switch 40B is moved to the "command" position 40E, it generates a "command-on" interrupt signal. This causes the COMMAND_ON_INTERRUPT routine 320 shown in FIG. 7 to be excuted. This routine causes the program to jump to the COMMAND_MODE subroutine 322 shown in FIG. 11. When the switch 40B is pushed back from the "command" position 40E to the central, or "pause"position 40F, switch 40B generates a "command-off" interrupt, which causes the CPU to execute the COMMAND_OFF_INTERRUPT routine 334. This routine 334 executes a step 336, which like step 324 described above, causes any uninterruptable processes to be completed. Step 340 then redisplays the screen, removing any prompts or menus which may have been caused by the last command. Then step 322 jumps back to the PAUSE_MODE 330 shown in FIG. 10.

It can be seen that switch 40B gives a user the ability to switch between three modes, a DICTATION_MODE 304, in which the system runs speech recognition of the type described in Application Ser. No. 797,294, a PAUSE_MODE 330, in which the system lies dormant until it is switched to the DICTATION_MODE or the COMMAND_MODE, and the COMMAND_MODE 322. Of these three modes, it is the COMMAND_MODE 322 which is of most interest to the present invention.

Figure 14:
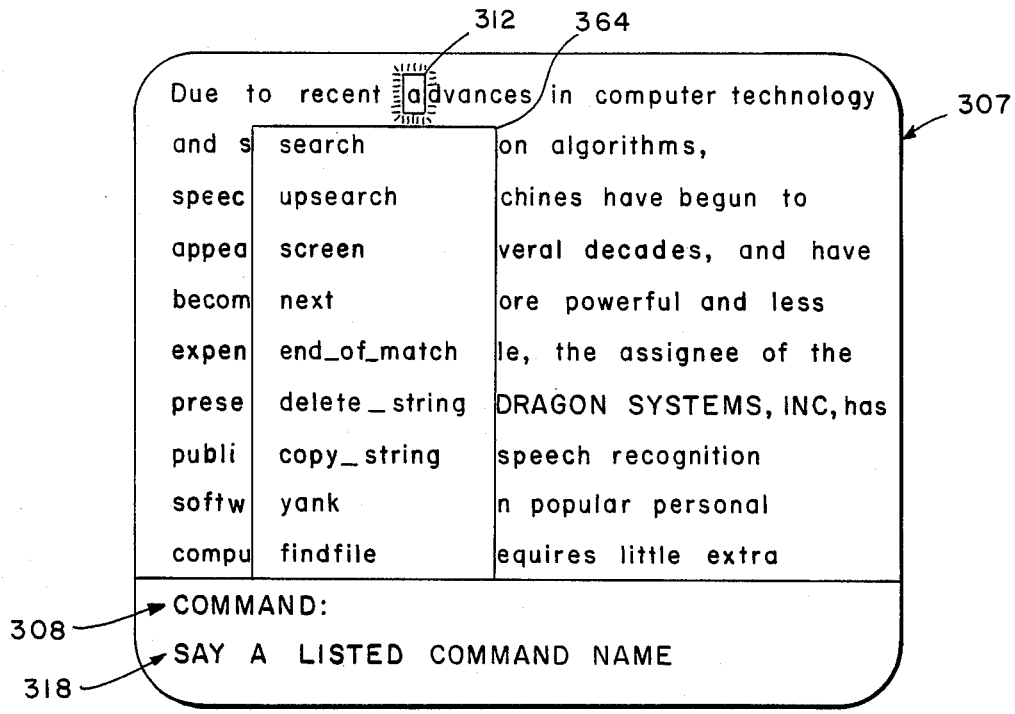
FIG. 14 illustrates how the screen appears as soon as the program has been switched to the COMMAND_MODE.

The COMMAND_MODE 322 contains a sequence of steps 350, 352, 354, 356, 358, 360, and 362 which are continually repeated until the user exits the COMMAND_MODE by pushing switch 40B away from the "command" position, generating a "command-off" interrupt. The first steps of the COMMAND_MODE routine is the step 350, which causes a menu of command choices 364 to be placed on the display screen 307, as is shown in FIG. 14. This menu includes the choice options "search," "upsearch," "screen," "next,"- "end-of-match," "delete-string," "copy-string," "yank," and "find-file". It should be understood that in other embodiments of the present invention, other commands could be included in the COMMAND_MODE menu, and that multiple COMMAND_MODEs, or hierarchical COMMAND_MODEs could be used to give the user access to a larger selection of commands, such as those which might be desired for controlling all the functions required for a full function word processor. The commands listed in FIG. 14 are those that relate most directly to the present invention.

Figure 11:
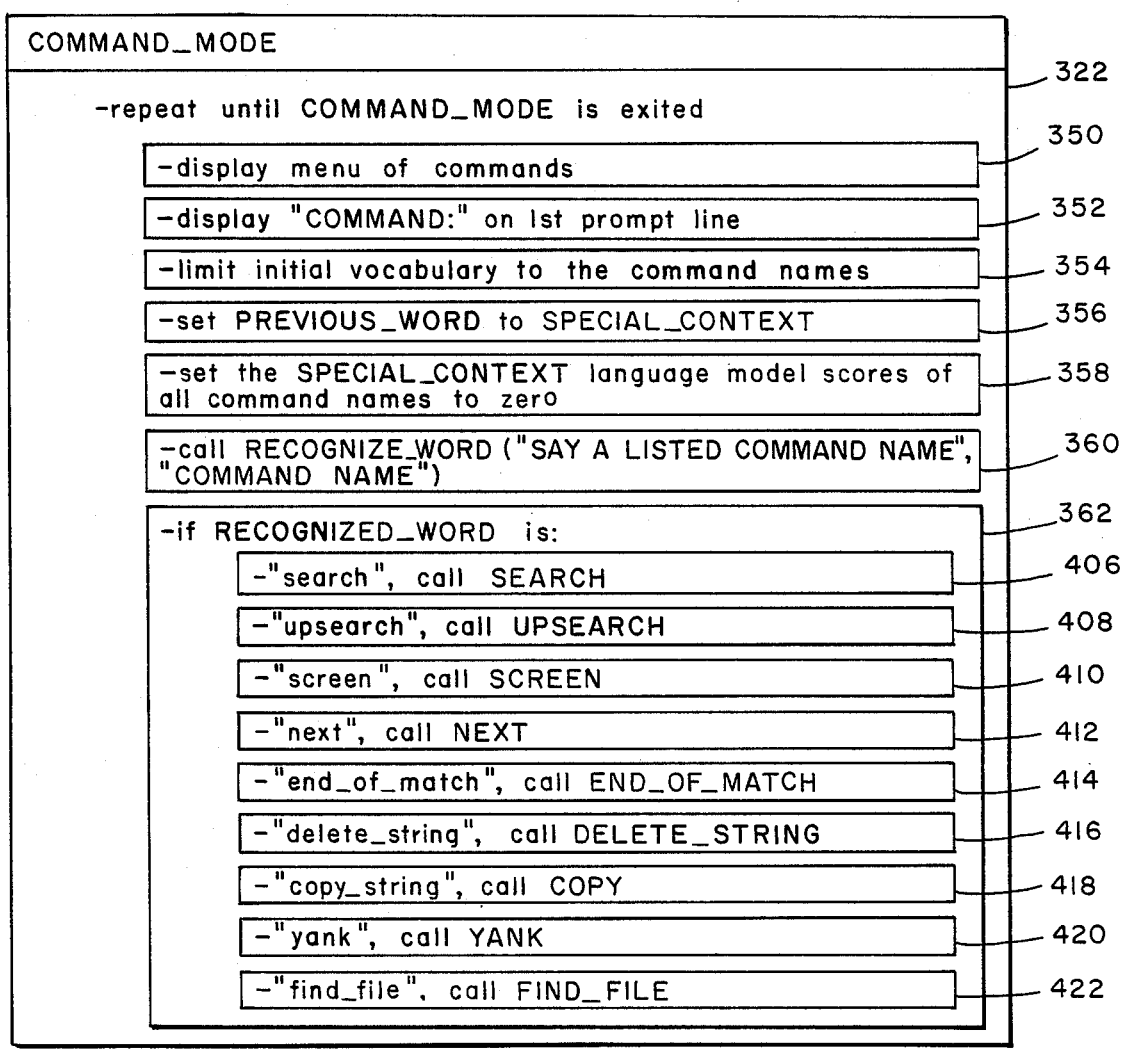

Once step 350 of FIG. 11 has displayed its menu of choices, step 352 displays the word "COMMAND" on the first prompt line 308 shown in FIG. 14. Then step 354 limits the initial vocabulary to the command names displayed in the menu 364 by step 350. This initial vocabulary is supplied to the prefiltering step 104, shown in FIG. 3, instead of the entire system vocabulary, which is used as the initial vocabulary in Application Ser. No. 797,294 and in the DICTATION_MODE of the current application.

The purpose of the prefiltering step 104 is to reduce the active vocabulary used by the more lengthy dynamic programming step 106 shown in FIG. 3 to one which the step 106 can process in a relatively short time. When the initial vocabulary is comprised of only a few words, as it is after step 354 limits it to the command names of menu 364, there is no need to perform prefiltering, since the vocabulary is already small enough to be handled rapidly by the step 106. For that reason, extra instructions can be inserted into the prefiltering block 104 which test the size of the initial vocabulary presented to it and which hand that initial vocabulary directly to the step 106 if the initial vocabulary has less than a certain number of words.

Once the initial vocabulary has been limited, step 356 of COMMAND_MODE sets a variable PREVIOUS_WORD to the value SPECIAL_CONTEXT. As is described in Application Ser. No. 797,294, the language scores used in steps 210 and 266, shown in FIG. 3 of the present application, are calculated for each word as a function of the previous word recognized by the system. This previous word is identified by the variable PREVIOUS_WORD. As is shown in FIG. 15, these language model scores can be represented as a matrix. In this matrix the language model score for a given word is found in the column corresponding to that word, in the row determined by the current value of PREVIOUS_WORD. FIG. 15 is similar to FIG. 12 of Application Ser. No. 797,294, but it adds a separate row labeled $W_O$ to specifically represent the case in whcih the variable PREVIOUS_WORD indicates that there is no known previous word, in which case the values of the language models associated with each vocabulary word is determined by the absolute likelihood of that word occurring, independent of what the previous word is.

In addition, FIG. 15 has an additional row labeled $W_{SC}$, where "SC" stands for special context. This row represents memory locations in which a language model scores calculated for use in special contexts are temporarily stored. Such special contexts include those that occur when the word to be recognized is limited to command names or to words occurring in a data structure, such as a portion of text to be searched. Setting PREVIOUS WORD to the value SPECIAL CONTEXT will cause the language model for each active word candidate to be drawn from this row $W_{SC}$ in which the special context language scores are stored.

It should be understood that in large vocabulary systems a language matrix having a row and column for each word in the vocabulary would have a very large number of entries. For example, a vocabulary of twenty-thousand words would have four hundred million entries. Such a matrix would consume too much memory to be practical for most applications and would have zeros in most of its entries, since it would be difficult to read enough text to find an occurrence of each vocabulary word after every other vocabulary word. In such large vocabulary systems, standard computer techniques for representing large but largely empty matrices can be used to represent the language model matrix.

After step 356 has been performed, step 358 sets the special context language model scores $W_{SC1}$ to $W_{SCN}$, which correspond to the command names, to zero. As is described in Application Ser. No. 797,294, a language score of zero represents a probability of 1, since language scores, and all the other likelihood scores in the preferred embodiment of the invention are calculated as negative logarithms of probability. Since the same score is added for all command words, the effect of language scores on determining which command word is recognized is canceled out. This is appropriate, since when the initial vocabulary is limited to a very small number of words, such as the nine command words of menu 364, there is usually little need for language scores, since presumably the sounds of the words are sufficiently distinct that they will not be easily confused.

Figure 16:
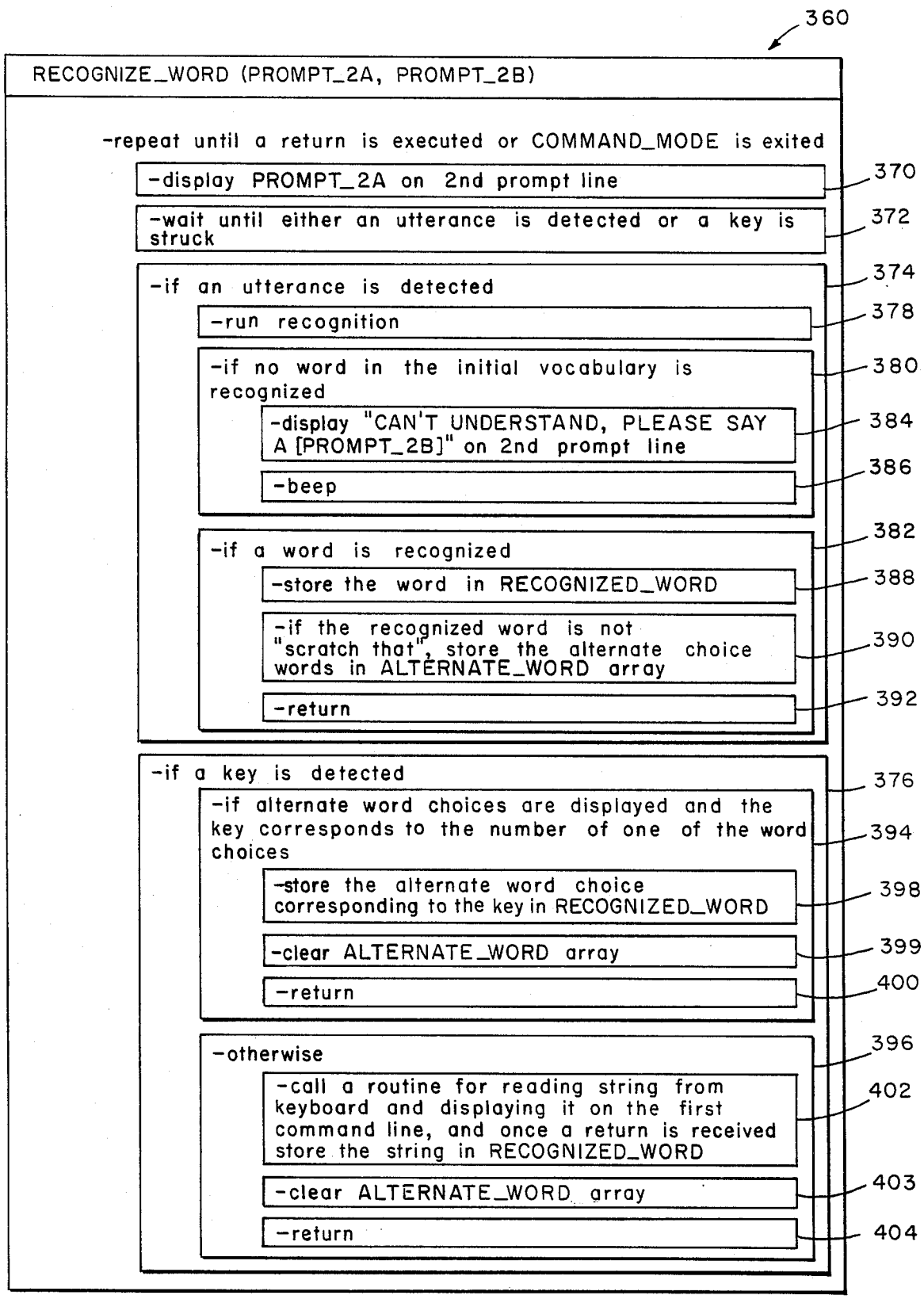
FIG. 16 is a schematic block diagram of the subroutine RECOGNIZE_WORD.

Once the language model scores of the command names have been set to zero, step 360 calls another subroutine, RECOGNIZE_WORD, shown in FIG. 16. RECOGNIZE_WORD is comprised of a sequence of steps 370, 372, 374, and 376 which are repeated until one of those steps executes a "return" instruction or until the user exits the COMMAND_MODE by pushing switch 40B out of "command" position. The first step of RECOGNIZE_WORD, step 370, displays the first prompt parameter with which the subroutine is called, PROMPT_2A, to be displayed on the second prompt line 318 of screen 307. When step 360 of COMMAND_MODE called RECOGNIZE_WORD, PROMPT_2A is "SAY A LISTED COMMAND NAME," and this string is displayed as is shown in FIG. 14. Once this is done, RECOGNIZE_WORD advances to step 372, which waits until either an utterance is detected or a key is struck. If an utterance is detected, the substeps of the step 374 are executed, if a key is struck, the substeps of the step 376 are executed.

If an utterance is detected, step 374 performs substeps 378, 380, and 382. Step 378 preforms recognition according to the algorithm of FIG. 3. Once this recognition is run and the best scoring word, if any, for the utterance has been determined, the subroutine advances to step 380, which determines whether or not the best scoring word, if any, is in the initial vocabulary. If not, steps 384 and 386 are executed. Step 483 displays a prompt consisting of the words "DID NOT UNDERSTAND, PLEASE SAY A"followed by the words of the parameter PROMPT_2B. When step 360 of COMMAND_MODE calls RECOGNIZE WORD, PROMPT_2B is "COMMAND NAME"so that the string displayed by step 384 is "DID NOT UNDERSTAND, PLEASE SAY A COMMAND NAME." After this prompt is displayed, step 386 calls a subroutine which sounds an audio beep for approximately ½ second, to draw the user's attention to the prompt. After this is done, the program skips the substeps contained in steps 382 and 376 and returns to steps 370 and 372 to wait for the detection of a new utterance or a detection of the pressing of a key.

If, however, the test at the top of step 380 of FIG. 16 determines that step 378 has recognized a word in the initial vocabulary, substeps 388, 390, and 392 of step 382 are executed. In this case, step 388 stores the word recognized by step 378 in the variable RECOGNIZED_WORD. Then, if the recognized word is not "scratch-that", step 390 stores the alternate word choices produced by the recognition process in an array having the name ALTERNATE_WORD. As is explained below with regard to FIG. 37, alternate word choices are saved so that if the user says "scratch-that", indicating that the last word was incorrectly recognized, the alternate choices produced in the recognition of that word will be avaiable for selection. Alternate word choices are not saved when the recognized word is "scratch-that"to prevent the alternate choices from the previous word from being over written. Once step 390 is complete, step 392 executes a return, which causes the subroutine RECOGNIZED_WORD to be exited.

If, on the other hand, step 372 detects the striking of a key on the keyboard 54 shown in FIG. 1, the substeps 394 and 396 of step 376 are executed. Step 394 tests whether any alternate word choices, such as the alternate word choices 398 shown in FIG. 37, are being displayed. If so, it checks whether the key just typed corresponds to one of the word choices displayed. If so, it executes steps 398, 399, and 400. Step 398 stores the word choice corresponding to the selected key in the variable RECOGNIZED_WORD. Step 399 clears the ALTERNATE_WORD array, because the current RECOGNIZED_WORD has been selected by key and thus has no associated alternate word choices. Then step 400 excutes a return instruction, causing RECOGNIZED_WORD to be exited.

If the test at the top of step 394 is not satisfied, RECOGNIZE_WORD executes the substeps 402, 403, and 404 of step 396, instead of the substeps of 396. Step 402 calls a routine which reads a string from the keyboard, starting with the key just received. This routine displays the characters of the string as they are read from the keyboard on the first command line 308 of the string 307, and, once a return is received, it stores the string in the variable RECOGNIZED_WORD. Step 403 clears the ALTERNATE_WORD array, because the current RECOGNIZED_WORD has been typed in by hand, and thus has no associated alternate word choices. Then step 404 executes a returns, returning RECOGNIZED_WORD to the routine that called it.

It can be seen that RECOGNIZE_WORD does not return to its calling program until the user has either spoken an utterance recognized as one of the current initial vocabulary words, until the user types a key associated with a currently displayed alternate word choice, if any, or until the user types a string of characters followed by a return character. In any of these three cases, the subroutine RECOGNIZED_WORD returns with the word selected by the user in the variable RECOGNIZED_WORD.

Returning now to FIG. 11, once step 360's call to RECOGNIZE_WORD is complete, COMMAND_MODE advances to step 362, which compares the new value of RECOGNIZED_WORD against the currently selectable command names and, when it finds a match in steps 406–422, it calls a correspondingly named subroutine shown in FIGS. 17-24. If RECOGNIZED_WORD does not correspond to any of the command names shown in step 362, steps 350-362 of COMMAND_MODE are repeated again, unless the operator pushes switch 40B out of the "command" position.

Thus it can be seen that the subroutine COMMAND_MODE gives the user the option of either speaking or typing any of the nine command names shown in menu 364. Once the user has selected one of these command names, its associated subroutine is called.

Figure 17:
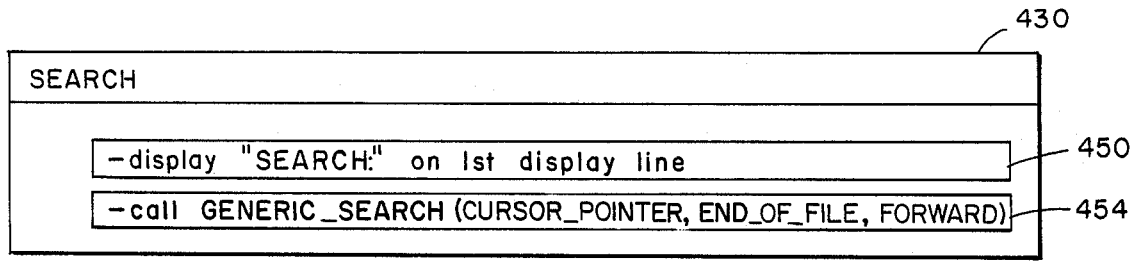
FIGS. 17-24 are schematic block diagrams of subroutines which can be selected in the COMMAND_MODE.
Figure 18:
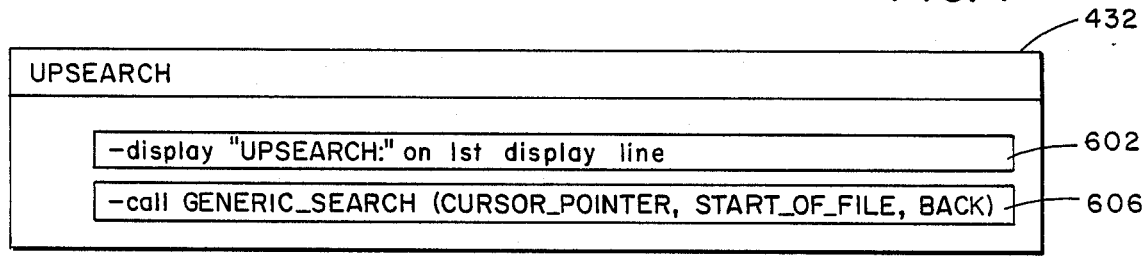

If the user slects the command name "search", step 406 calls the subroutine SEARCH 430, shown in FIG. 17. SEARCH has two steps, 450 and 454. Step 450 displays "SEARCH:" on the first display line 308, as is shown on FIG. 34. Then step 454 calls a subroutine GENERIC-SEARCH. It calls GENERIC-SEARCH with a parameter SEARCH_START, which indicates the location at which the search is supposed to start, equal to the current value of the CURSOR; and with a parameter SEARCH_END, which indicates the location of at which the search is to end, equal to the end of the file; and with a parameter SEARCH_DIRECTION, which indicates the direction in which the search is to take place, set to the forward direction.

Figure 25:
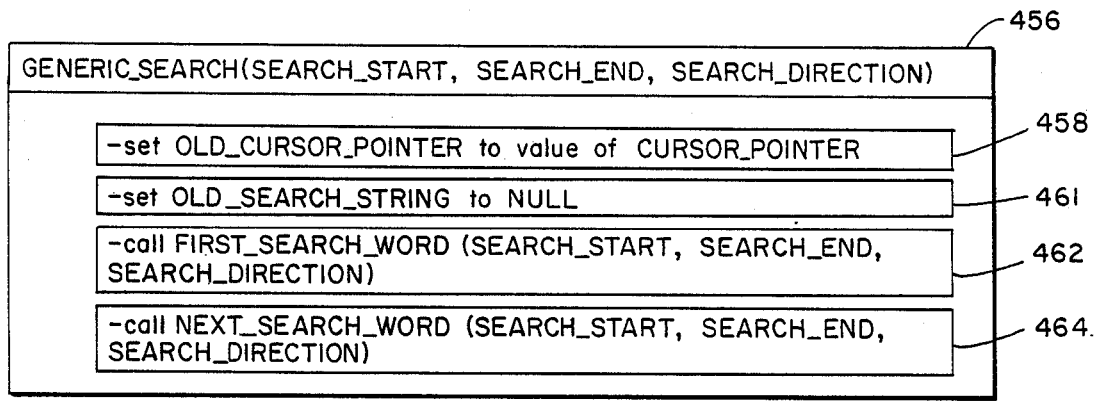
FIGS. 25-27 are schematic block diagrams of subroutines used by the subroutines shown in FIGS. 17-24.
Figure 26:
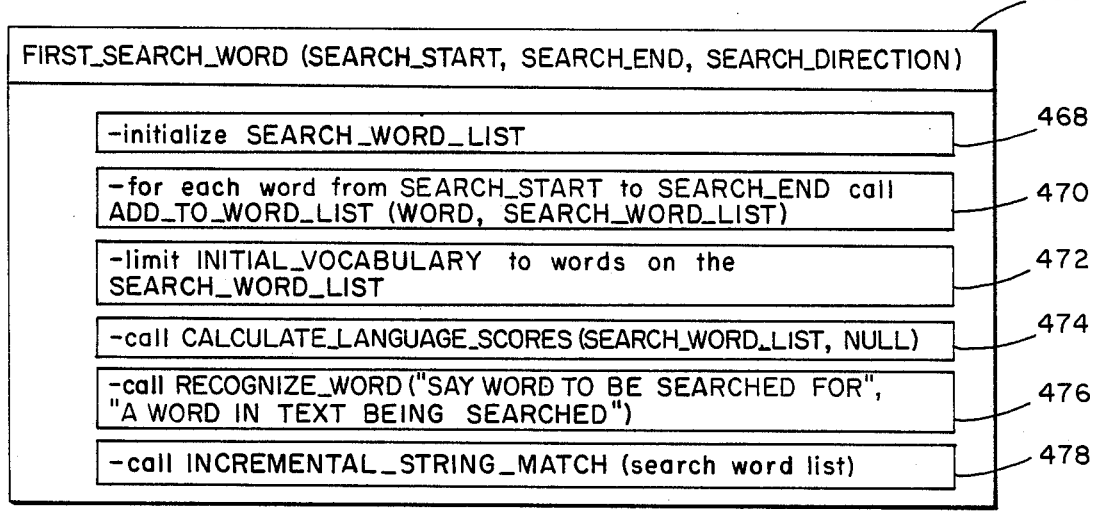

The subroutine GENERIC-SEARCH is shown in FIG. 25. It consists of four steps, 458, 461, 462, and 464. Step 458 sets the variable OLD_CURSOR-POINTER equal to the value in CURSOR-POINTER, which stores the current location of the CURSOR, as is indicated schematically in FIG. 28. OLD_CURSOR-POINTER is used to save the location of the CURSOR before a search is started, so the user can return to that location if the system misrecognizes a search word and moves to an undesired location in the text. Step 460 sets a variable OLD_SEARCH_STRING equal to null, or zero, so as to clear the search string for the current search. Then step 462 calls a subroutine FIRST_SEARCH_WORD, which is shown in FIG. 26 with the same parameters as the subroutine GENERIC-SEARCH was called with.

The subroutine GENERIC-SEARCH is designed to perform an incremental search which moves the CURSOR in response to each successive word which is added to its search string. FIRST_SEARCH_WORD shown in FIG. 26 is designed to perform the search for the first word placed in the search string. This subroutine contains six substeps 468, 470, 472, 474, 476 and 478. The first of these steps, step 468 initializes a table called SEARCH_WORD_LIST 480, shown in FIG. 28. Step 468 obtains memory to use for this table and clears all the values in that table to zero. Then step 470 scans the text to be searched, from the location indicated by SEARCH_START to the location indicated by SEARCH_END, and calls the subroutine ADD_TO_WORD_LIST, shown in FIG. 27, for each word which it finds between those locations. When FIRST_SEARCH_WORD is called as part of the SEARCH command, as in the case currently being described, step 470 of FIG. 26 calls ADD_TO-WORD_LIST once for each word between the current CURSOR location 312 and the end of the file, handing it the current word, WORD, and the name of the current word list, which in this case is the SEARCH_WORD_LIST 480 shown in FIG. 28.

Figure 27:
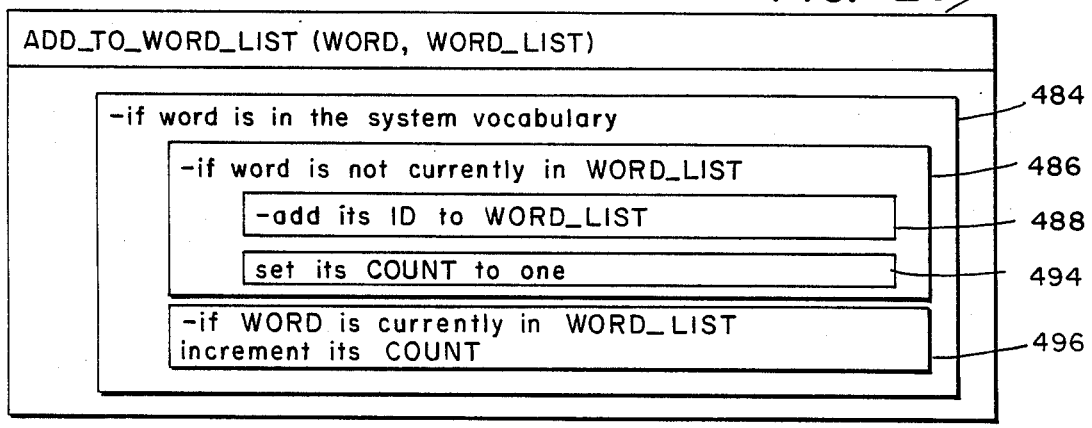

ADD_TO-WORD_LIST of FIG. 27 checks in step 484 to determine if the current word 481 is in the system vocabulary, which is the vocabulary of all words for which the system has acoustic models, and thus is capable of recognizing. If so, the subroutine executes steps 486 and 496. Step 486 tests whether the current word 481 is currently in the SEARCH_WORD_LIST 480. If not, steps 488 and 494 are performed. Step 488 places the ID of the current word 481 in the first open space in the ID column 491 of the SEARCH_WORD_LIST 480. Then step 494 sets the corresponding count value in the count column 492 of the SEARCH_WORD_LIST 480 to a value of one. If, on the other hand, the current word 481 already is in the SEARCH_WORD_LIST 480, a step 496 merely increments its associated count value by 1.

Figure 28:
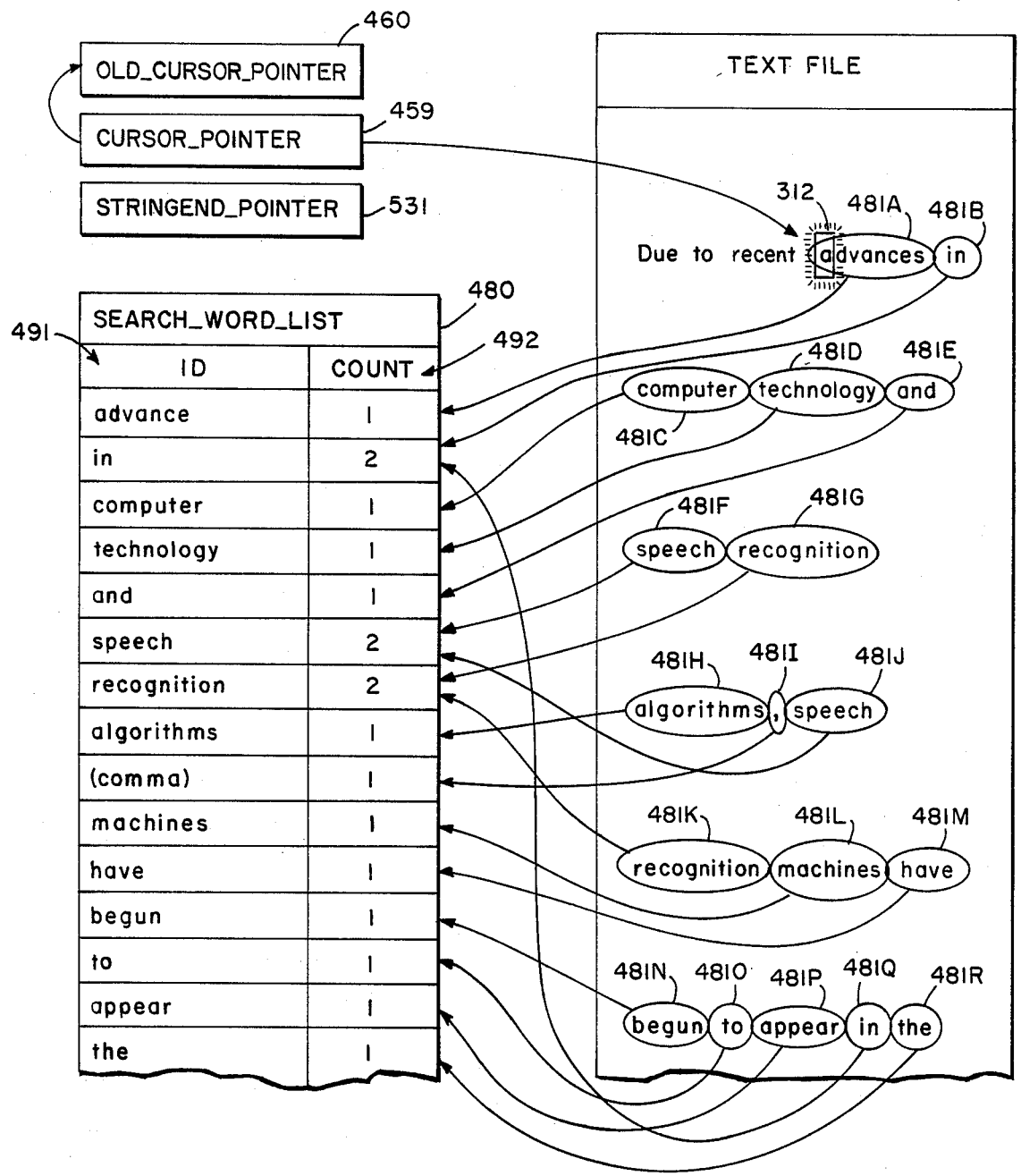
FIG. 28 is a schematic diagram illustrating the creation of a SEARCH_WORD_LIST as is performed in the subroutine FIRST_SEARCH_WORD shown in FIG. 26.

As FIG. 28 indicates, after step 470 has called the subroutine ADD_TO_WORD_LIST for each word, from the current CURSOR location 312 to the end of the file, the SEARCH_WORD_LIST 480 will list all the vocabulary words which occur in that portion of text and the number of times which each of those words occur in that portion of text. Of course, FIG. 28 only illustrates the calculation of the SEARCH_WORD_LIST for a small portion of text, but the same principal is used for the entire body of text to be searched.

Returning now to FIG. 26, once step 470's call to ADD_TO-WORD_LIST has been completed for each word in the text to be searched, FIRST_SEARCH_WORD advances to step 472. Step 472 limits the initial vocabulary to words in the SEARCH_WORD_LIST 480 just calculated by step 470. This limits the vocabulary of words which can be recognized as search words to words which occur in the text to be searched. Most documents under one hundred pages contain only several thousand different words. This is substantially smaller vocabulary than the twenty thousand or more words which is considered desirable for a general purpose dictation machine. Short documents of several pages will have a much smaller vocabulary. The reduction of the recognition vocabulary reduces the chance that the system will misrecognize a search word, since it reduces the number of vocabulary words against which the search word to be recognized will be compared.

Figure 30:
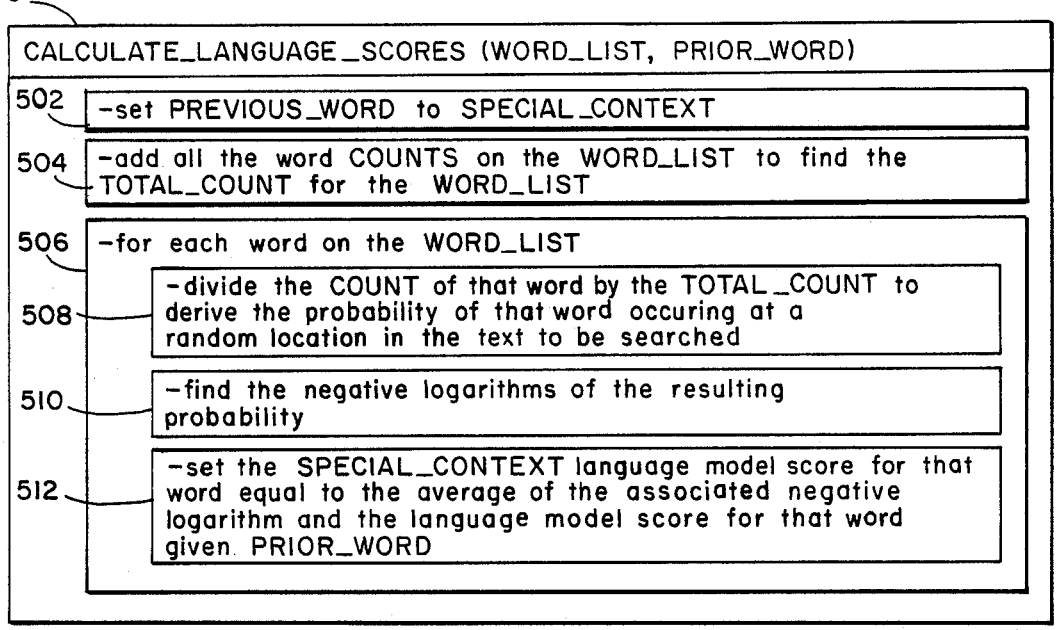

After step 472 has limited the initial vocabulary, step 474 calls a subroutine CALCULATE_LANGUAGE_SCORES shown in FIG. 30, passing it the current SEARCH_WORD_LIST as a WORD_LIST parameter and the value NULL or zero, as the PRIOR-WORD parameter, to indicate that there is no prior word for purposes of calculating a language model score. CALCULATE_LANGUAGE_SCORES is used to set the special context language model scores used in the recognition of search words. It's first step 502 sets the variable PREVIOUS_WORD to value SPECIAL_CONTEXT so that the language scores, LANGSCORE, use by the algorithm shown in FIG. 3 will be the special context language model scores stored in the bottom row $W_{SC}$, shown in FIG. 15. Step 504 adds up all of the counts occurring in the column 492 of the current WORD_LIST to find a value TOTAL_COUNT, indicating the total number of words occurring in the body of text to be searched.

Step 506 performs three substeps for each word occurring in the word list. Step 508 divides the count associated with that word in the current WORD_LIST by the TOTAL_COUNT to drive the probability of that word occurring at a random location in the text to be searched. Then step 510 finds the negative logarithms of the resulting probability. As is described in Application Ser. No. 797,259, it is convenient to use negative logarithms to represent probabilities, since the values represented by logarithms can be multiplied merely by adding the logarithms which represent them. Since addition is usually simpler than multiplication, this saves computation. Negative logarithms are used because probabilities are numbers between 0 and 1, and thus their logarithms are negative. The negatives of such logarithms are positive numbers, which many people find easier to deal with. Step 512 sets the special context language model score of that word, that is its score in the last row $W_{SC}$ of FIG. 15, equal to the average of the score calculated for that word in steps 508 and 510 and the language model score for that word, using the value PRIOR-WORD to determine the row in table of FIG. 15 from which to draw that language score. This averaging of likelihood scores causes the probability that a given word would be used as a search word to vary both as a function of the frequency of that word occurring in the text to be searched and as a function of the frequency with which the given word occurs in preceded by current word in PRIOR-WORD, as determined statistically from a large sampling of text. The exact formula used to combine these probabilities can be varied to accommodate different expectations about the relative importance of these two different likelihood in determining what a search word will be.

In the current example, when CALCULATE_LANGUAGE_SCORES is called by step 474 of FIRST_SEARCH_WORD, PRIOR-WORD is set to NULL, meaning that the language model scores used in step 512 of CALCULATE_LANGUAGE_SCORES are taken from the first row $W_O$ of FIG. 15, which is the language model score representing the probability of that word occurring independent of any knowledge of the previous word. This is appropriate for recognizing the first word of a search string, since the context of that first word is unknown.

Returning to FIG. 26, once step 474's call to CALCULATE_SEARCH_WORD is complete, FIRST_SEARCH_WORD advances to step 476. This step calls the subroutine RECOGNIZE_WORD, described above with regard to FIG. 16. It calls RECOGNIZE_WORD with PROMPT 2A set to "SAY WORD TO BE SEARCHED FOR" and PROMPT_2B set to "A WORD IN THE TEXT BEING SEARCHED." This causes the program to place the prompt "SAY WORD TO BE SEARCHED FOR" on the second prompt line 318 and then wait for the user to either speak a word recognized as a word in the SEARCH_WORD_LIST, or type a word followed by carriage return. RECOGNIZE_WORD returns with either the spoken or the typed word as RECOGNIZED_WORD.

Figure 31:
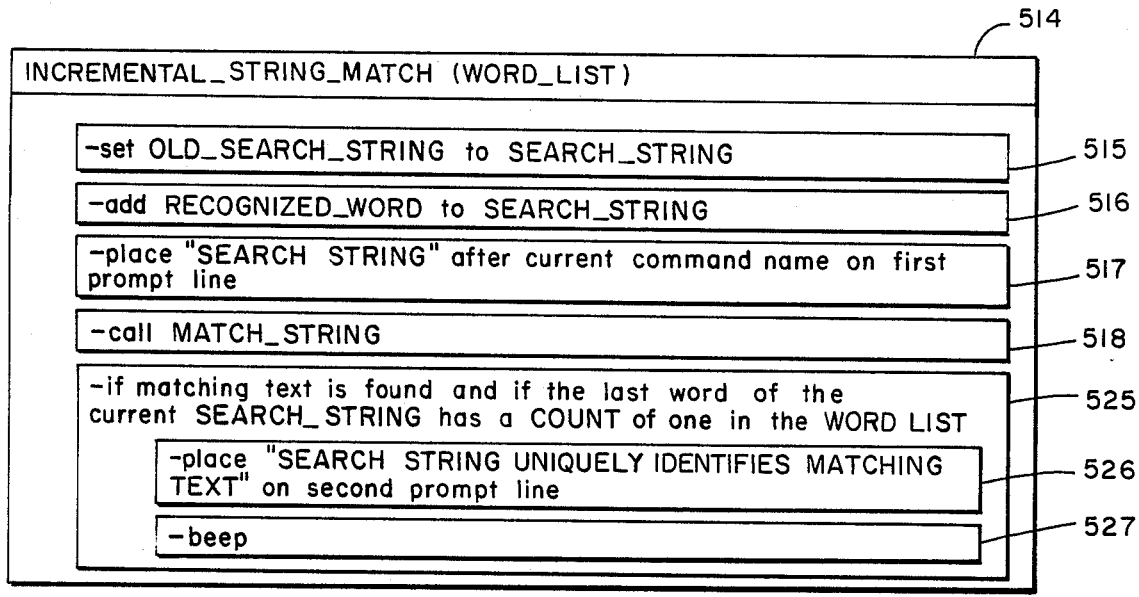
Figure 34:
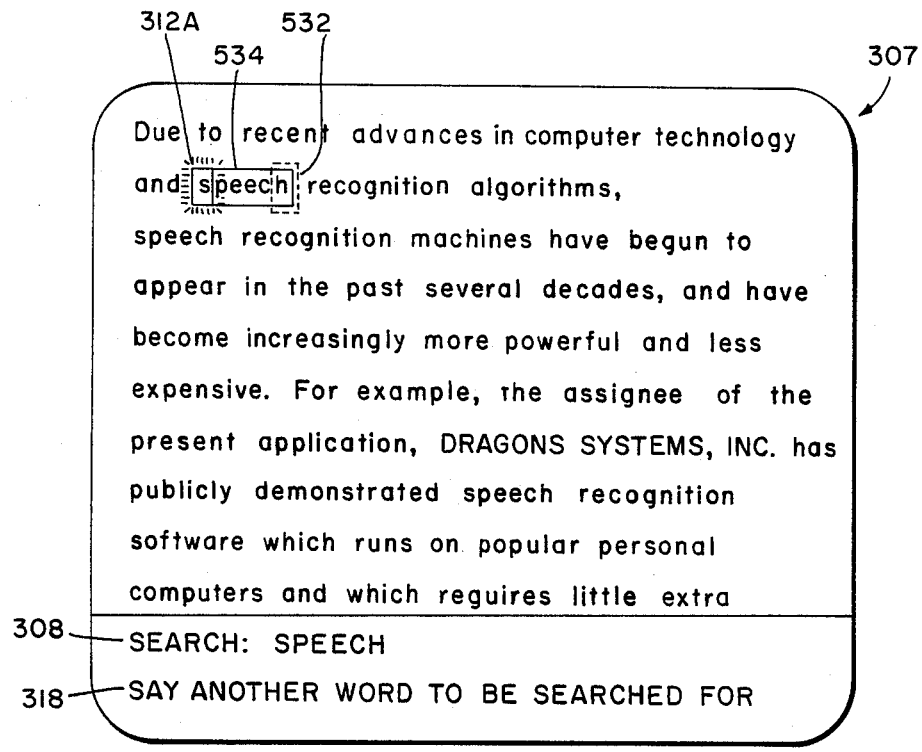
FIG. 34 is a schematic representation of the video display screen after the system has found text matching a search string that contains a single word.

Once this occurs, step 478 of FIG. 26 calls a subroutine INCREMENTAL_STRING-MATCH, shown in FIG. 31. In its first step, step 515, INCREMENTAL_STRING-MATCH saves the current search string in OLD_SEARCH_STRING. This is done so the user can return to the old search string if the last word added to the search string is incorrect. Next step 516 adds the current RECOGNIZED_WORD to the current search string. Next step 517 places the current search string on line 308 of the screen 307 after the current command word, which in the present case is the word "SEARCH:", as is illustrated in FIG. 34. This lets the operator see what the search string is.

Figure 32:
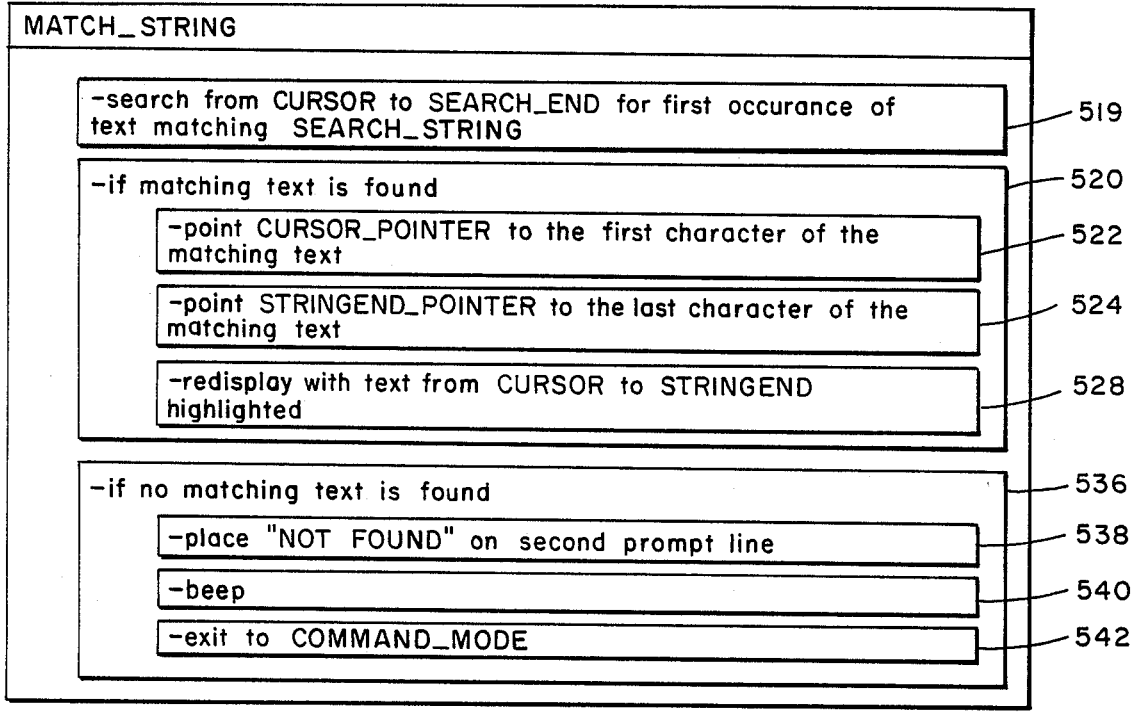

Then step 518 of FIG. 31 calls the subroutine MATCH_STRING, shown in FIG. 32. MATCH_STRING searches for and indicates the occurrence of text which matches the current search string. Step 519 of MATCH_STRING searches from the CURSOR location stored in CURSOR-POINTER to the location stored in SEARCH_END for the first occurrence of text which matches the search string. Step 520 tests if any text is found which matches the search string. If so, substeps 522, 524, and 528 are executed. The first of these, step 522 sets the location of the CURSOR stored in CURSOR-POINTER 459, shown in FIG. 33, equal to the first character 312B of the first portion of text 530A found to match the search string, which at the current times is the word "speech".

After step 522 of MATCH_STRING is complete, step 524 sets the location STRINGEND stored in the STRINGEND_POINTER 531 to the last character 532 of the first occurrence of matching text. Then step 528 redisplays the text on the screen 307 so that the first occurrence 530A of matching text is highlighted, as indicated at 534 in FIG. 34.

If step 519 of MATCH_STRING fails to find any text matching the search string, the substeps of step 520 are skipped and instead the substeps 538, 540, and 542 of step 536 are performed. Step 538 places the prompt "NOT FOUND" on the second prompt line 538 of screen 307. Step 540 beeps to draw the user's notice to this prompt. Then step 540 exits to the top of the COMMAND_MODE routine of FIG. 11, placing the machine in the same state as if the user had just entered COMMAND_MODE for the first time. This gives the user the option of executing a new command or returning to DICTATE_MODE by pushing up the switch on microphone 40.

If the call by step 518 of FIG. 31 to MATCH_STRING finds text which matches the search string, MATCH_STRING returns to step 518. Then step 525 of INCREMENTAL_SEARCH_MATCH test if the last word of the current search string has a count of 1 in the current WORD_LIST. If so, step 526 places the prompt "SEARCH STRING UNIQUELY IDENTIFIES MATCHING TEXT" on the second prompt line 318, and step 527 beeps to draw the user's attention to the prompt. In the current example the count in the SEARCH_WORD_LIST of the last word of the current search string, "speech," is greater than one, and thus no such prompt is made. The purpose of step 525 is to inform a user when he has added enough words to the search string to uniquely specify a portion of text. This is useful if a user is searching for a particular position in a large document by saying a sequence of words located at that position. Once step 525 informs the user that he has uniquely identified the matching text, he known that he need not speak any more words to find the desired location.

Figure 33:
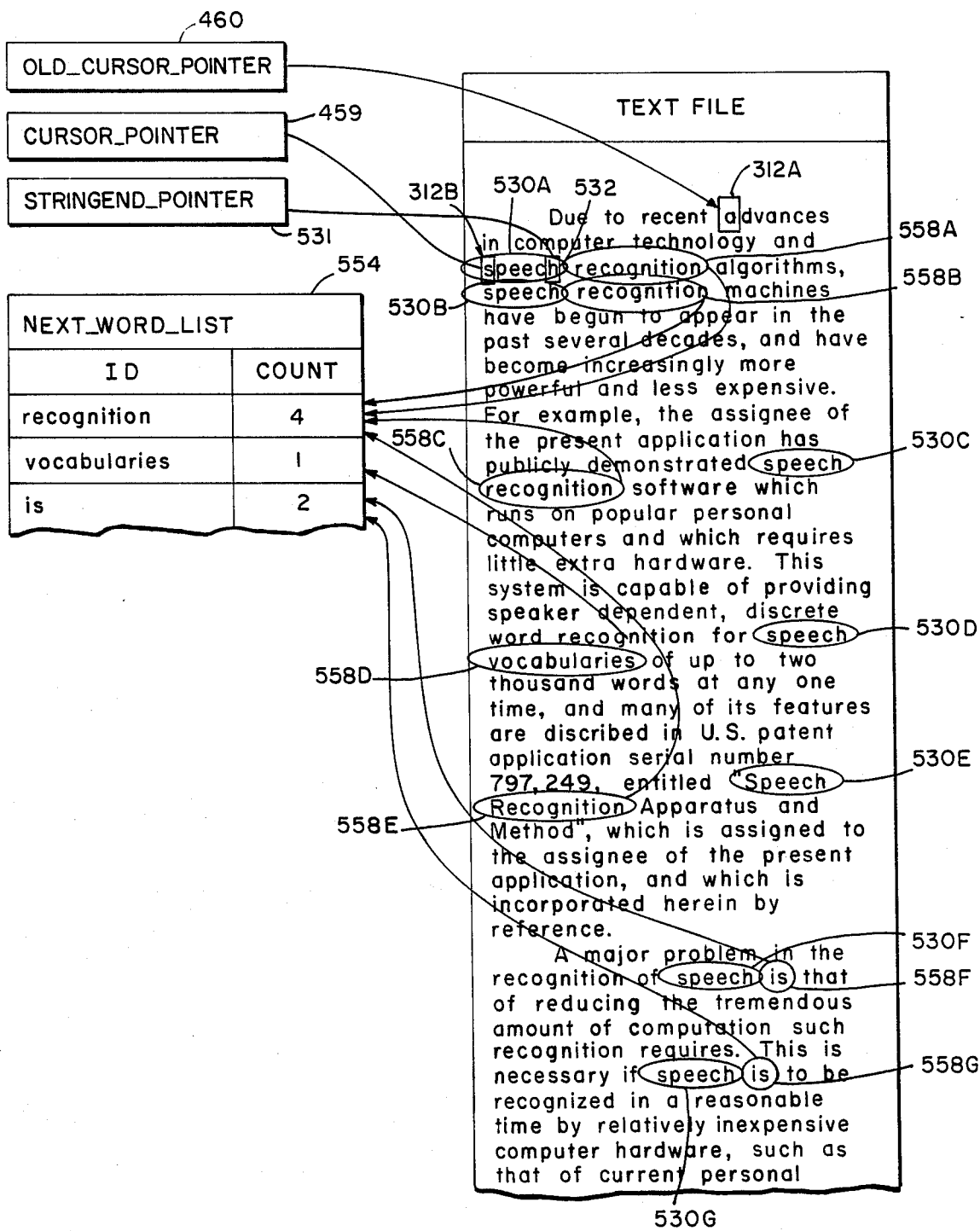
FIG. 33 is a schematic diagram illustrating the formation of a NEXT_WORD_LIST performed in the subroutine NEXT_SEARCH_WORD shown in FIG. 29.

In the example currently being explained, it is assumed that step 518 of INCREMENTAL_SEARCH_STRING finds that text 530A, shown in FIG. 33, matches the current search string, "speech". As a result, the screen 307 appears as is shown in FIG. 34.

After INCREMENTAL_SEARCH_STRING returns to step 478 of FIRST_SEARCH_WORD of FIG. 26, FIRST_SEARCH_WORD is complete, and it returns to step 462 of GENERIC-SEARCH of FIG. 25. At this point, GENERIC-SEARCH executes step 464, which calls the subroutine NEXT_SEARCH WORD shown in FIG. 29.

Figure 29:
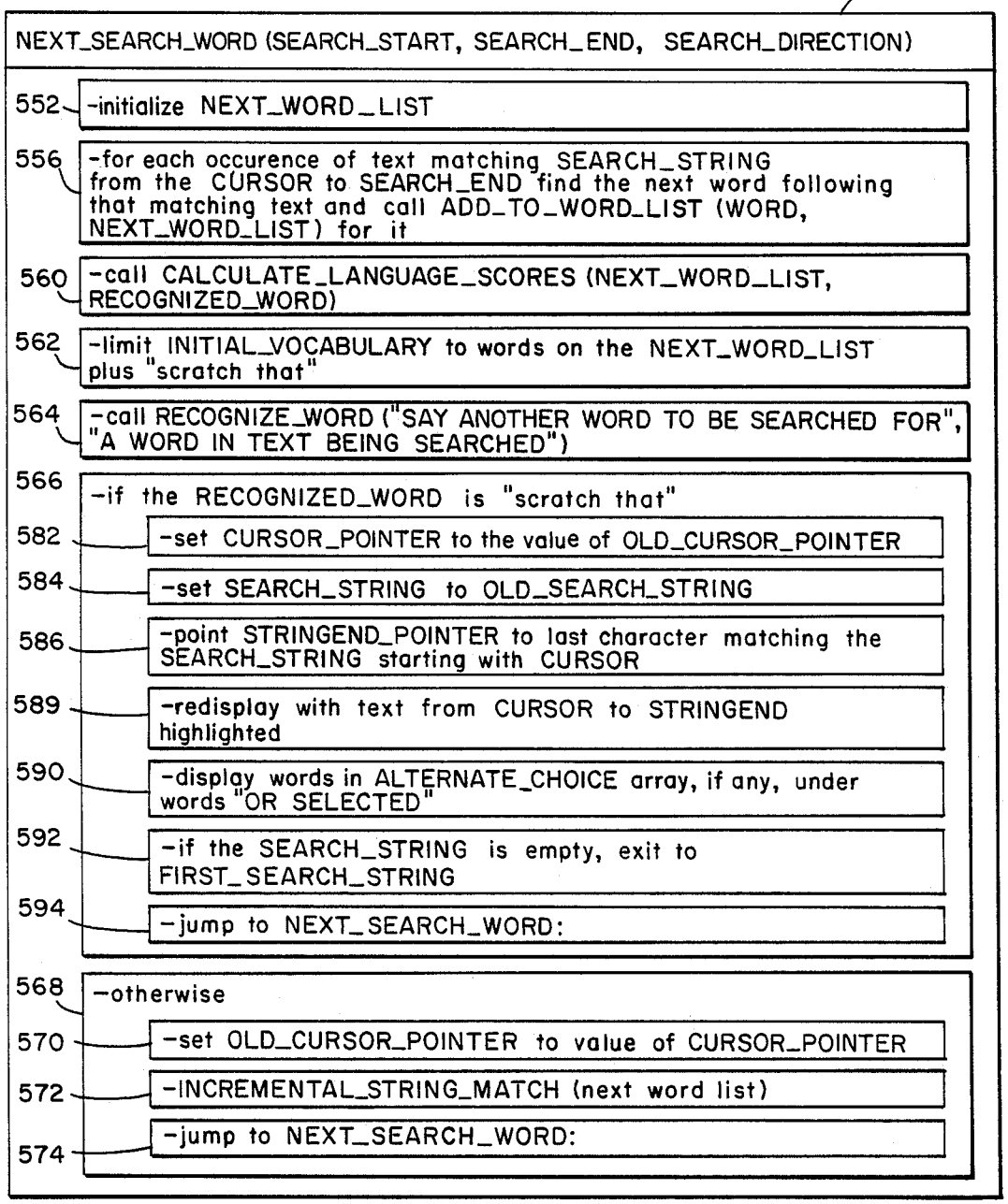
FIGS. 29-32 are schematic block diagrams of additional subroutines used by some of the subroutines shown in FIGS. 17-24.

NEXT_SEARCH_WORD of FIG. 29 is designed to get additional search words after the first word of a search string has already been obtained, and to perform a search for text matching the search string after each successive word is added to that string. Unlike FIRST_SEARCH_WORD, which counts all the words in the text to be searched in calculating its SEARCH_WORD_LIST, NEXT_SEARCH_WORD counts only those words which occur immediately after portions of text which match the previous search string in calculating its corresponding NEXT_WORD_LIST.

NEXT_SEARCH_WORD starts with step 552, which initializes the NEXT_WORD_LIST 554, by obtaining and clearing enough memory to build such a list. Step 556 then searches from the CURSOR location established by the search for FIRST_SEARCH_WORD to the location pointed to by SEARCH_END for all occurrences of text matching the current search string. In the current example, step 556 searches from the CURSOR location 312B shown in FIG. 33 to the end of the file for all occurrences of "speech." The result is indicated schematically in FIG. 33, which shows a portion of the text being searched and indicates a plurality of occurrences 530A through 530G of text matching the search string.

As is illustrated in FIG. 33, for each occurrence of text 530A–530G which matches the current search stirng, step 556 finds the word 558A–558G which immediately follow that matching text. For each such immediately following word it calls ADD_TO-WORD_LIST, described above, with that word as the parameter WORD shown in FIG. 27 and with the NEXT_WORD_LIST as the parameter WORD_LIST shown in that FIG. ADD_TO-WORD_LIST checks to see if the word is in the system vocabulary. If so, and if the word is not already in the NEXT_WORD_LIST, it adds that word's ID to the next empty ID slot in the NEXT_WORD_LIST and sets its count to one. If it is in the system vocabulary and is already in the NEXT_WORD_LIST, increments its count in that list. As a result, after step 556 is complete, the NEXT_WORD_LIST 554 contains a complete count of all the words in the system vocabulary which occur in the text to be searched immediately after words matching the current match search string.

Once step 556 of FIG. 29 is complete, step 560 calls the subroutine CALCULATE_LANGUAGE_SCORES shown in FIG. 30. It does so with the NEXT_WORD_LIST just calculated in step 566 as the parameter WORD_LIST and the variable RECOGNIZED_W0RD, which is the last word of the current search string, as the parameter PRIOR-WORD. As is described above, CALCULATE_LANGUAGE_SCORES sets the variable PREVIOUS_WORD to the value SPECIAL_CONTEXT, indicating that special context language model scores are to be used the recognition of the next search word. Then it calculates a special context language model score for each of the words in the NEXT_WORD_LIST 554 based on the count of that word in the NEXT_WORD_LIST and on the probability of that given word occurring given the immediately preceding word, PRIOR WORD, of the search string.

Once step 560 of FIG. 29 is complete, step 562 limits the intial vocabulary used by the prefilter step 104 of FIG. 3 to words in the NEXT_WORD_LIST plus the word "scratch-that." In most instances the number of words contained in the NEXT_WORD_LIST is quite small, and thus step 560 greatly reduces the chance for mistaken recognition of search words in the second or subsequent words of a search strings.

Next step 564 calls the subroutine RECOGNIZE_WORD with PROMPT_2A equal to "SAY ANOTHER WORD TO BE SEARCHED FOR" and PROMPT_2B equal to "A WORD IN TEXT BEING SEARCHED." RECOGNIZED_WORD places the PROMPT_2A on the second prompt line 318 of screen 307, as is shown in FIG. 33, and waits for the user to say an utterance recognized as a word in the current initial vocabulary or type a word followed by a return key. Once the user does so, RECOGNIZE_WORD returns with the spoken or typed word in RECOGNIZED_WORD. In the present example, it is assumed that the operator has spoken the word "recognition" and, thus, that the RECOGNIZED_WORD has been set to that word.

Figure 35:
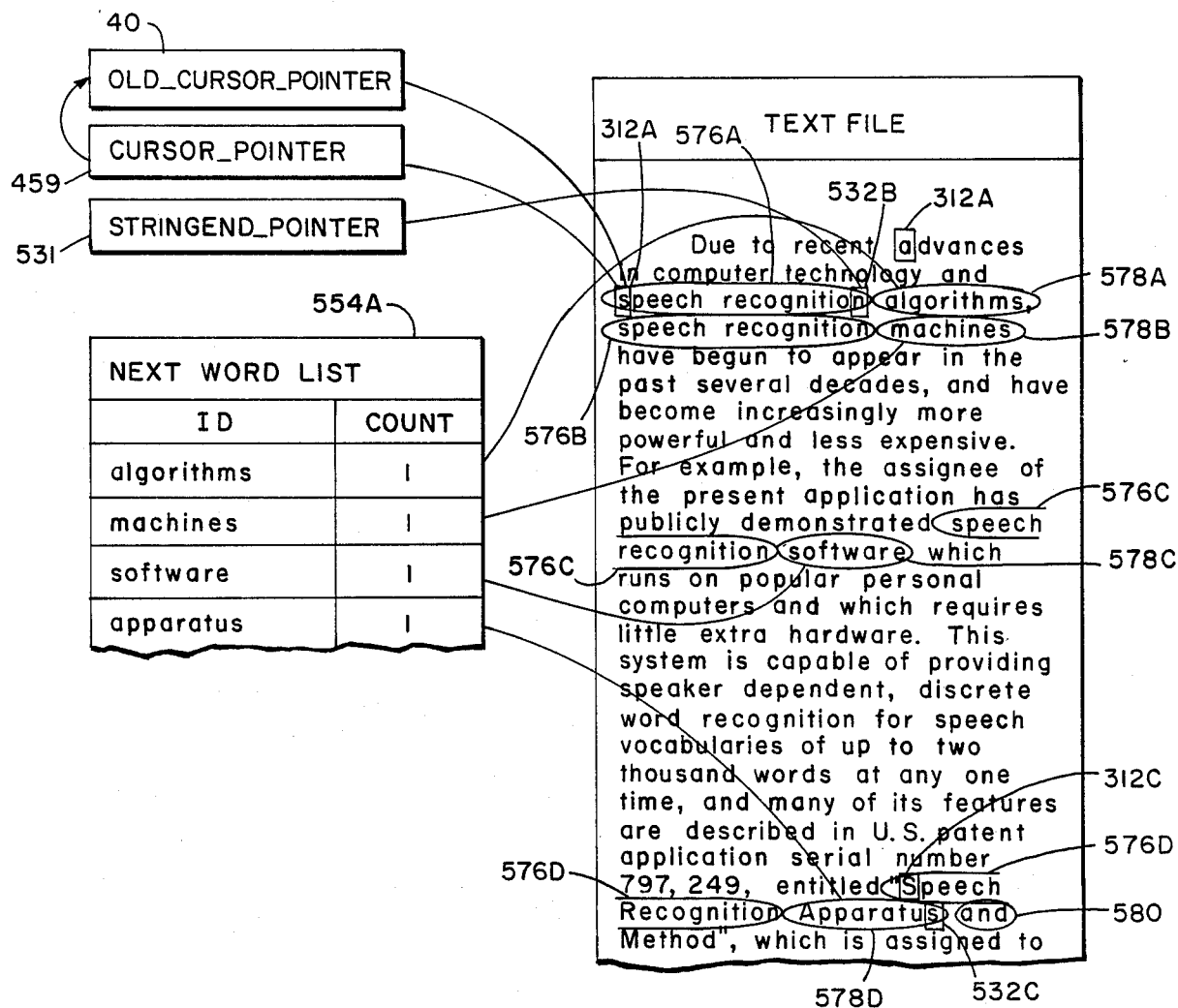
FIG. 35 is a schematic illustration of the formation of a NEXT_WORD_LIST once the search string has been expanded to include two words.

Next step 556 of FIG. 29 test if the variable RECOGNIZED_WORD has the value "scratch-that." In the current example it does not, and, thus, the substeps of step 566 are not performed. Instead the substeps 570, 572, and 574 of step 568 are executed. Step 570 save the current CURSOR address stored in CURSOR-POINTER 459 in the OLD_CURSOR-POINTER 460. Then step 572 calls the subroutine INCREMENTAL_STRING-MATCH, described above with regard to FIG. 31. INCREMENTAL_STRING-MATCH adds the RECOGNIZED_WORD, "recognized", to the current search string, "speech," setting the search string to "speech recognition." Then INCREMENTAL_STRING-MATCH calls MATCH_STRING, which searches from the CURSOR to SEARCH_END, currently the end of the file, for the first occurrence of text matching the search string. In FIG. 35, the first occurrence 576A of such text starts at the same position in which the CURSOR was located before the search. Thus, in this case, adding an extra word to the search string does not move the CURSOR. The STRINGEND_POINTER 531, however, is pointed to a new location 532B by this search, as is shown in FIG. 35. Then the screen is redisplayed with the text matching the search string highlighted.

Once the call by step 572 of FIG. 29 to INCREMENTAL_SEARCH_MATCH is complete, step 574 jumps to the top of NEXT_SEARCH_WORD, to add another word to the search string and perform a search upon it.

On this second time through NEXT_SEARCH_WORD, step 552 again initializes the NEXT_WORD_LIST and step 556 scans from the current CURSOR 312A to the end of the file for all occurrences 576A-576D of text matching the current search string, "speech recognition." For each occurrence of matching text, step 556 finds the immediately following word 578A-578D, shown in FIG. 35, and calls ADD_TO-WORD_LIST. After step 556 is complete, a new NEXT_WORD_LIST 554A is created, as is shown in FIG. 35. Once this is done, step 560 calculates special context language model scores for each word in that word list, and step 562 limits the initial vocabulary to the words in that word list, plus the word "scratch-that." Then RECOGNIZED_WORD is called.

In the current example, it is assumed that the next word spoken by the operator is "apparatuses." But for purposes of example it is assumed that the recognition process shown in FIG. 3 mistakenly scores the singular word "apparatus" as the best scoring word and places it in the variable RECOGNIZED_WORD. It is also assumed that the recognition algorithm scores the correct word "apparatuses" as the only close call word with high enough score to be placed in the ALTERNATE_WORD array.

After step 564 of FIG. 29 returns from RECOGNIZE_WORD, the program skips to step 568 because RECOGNIZED_WORD is not "scratch-that". Step 568 saves the current CURSOR in the OLD_CURSOR-POINTER and then calls the subroutine INCREMENTAL_SEARCH_STRING. INCREMENTAL_SEARCH_STRING adds "apparatus" to the current search string, places the current search string after the command name on the first prompt line 308, as shown in FIG. 36, and then searches from the current CURSOR 312A for the first occurrence of text matching the search string. In FIG. 35 this matching text is indicated by the combination of the words indicated by numerals 576D and 578D. INCREMENTAL_SEARCH_STRING then sets the CURSOR to the first character of this matching text, as indicated at 312C in FIG. 35, and sets STRINGEND to the last character 532C of the matching text.

When Step 525 of INCREMENTAL_STRING SEARCH checks the NEXT_WORD_LIST, it finds that the last word of the current search string, "apparatus" in the current example, has a count of one. As a result, step 526 prompts that the search string has been uniquely defined and step 527 beeps to draw the users attention to that prompt. At this time the screen has the appearance shown in FIG. 36.

After the call in step 572 of FIG. 29 is complete, step 574 jumps to the top of NEXT_SEARCH_WORD to perform the next step of the incremental search. Were the user to enter another search word, this next step would be performed in manner as described above, except that the NEXT_WORD_LIST produced would contain only one word. This would result because the example assumes that there is only one occurrence of text matching the search string "speech recognition apparatus." If the users were to enter successive search words from the text starting at the current CURSOR location, the only effect would be to move STRINGEND to the end of each additional word entered, thus increasing the length of text highlighted on the screen 307. As is explained below, this is useful for defining blocks of text upon which word processing operations such as copying and deletion can be performed.

If, on the other hand, the user were to speak a search word which causes the search string to differ from the text starting at the current CURSOR, step 536 of the next call to MATCH_STRING would inform the user that a matching string was "NOT FOUND" and would place the program at the top of the command mode.

In the current example, however, it is assumed that after the user sees the screen 307 shown in FIG. 36 he realizes that the system has mistakenly added the singular word "apparatus" rather than the plural word "apparatuses" to the search string. Thus it is assumed that the operator says the word "scratch-that" and that step 564 of FIG. 29 returns with "scratch-that" as RECOGNIZED_WORD, and with the ALTERNATE_CHOICE array unchanged since its mistaken recognition of the word "apparatus." As a result, the test at the top of step 566 is met and the substeps 582 through 592 of that step are performed. Step 582 restores the former CURSOR position stored in the OLD_CURSOR-POINTER 460 to the CURSOR-POINTER 459. In the example shown in FIG. 35, this moves the CURSOR from the location 312C back to its former location 312A. Then step 584 of FIG. 29 sets the search string to the value stored in the variable OLD_SEARCH_STRING. In the present example, this converts the search string from "speech recognition apparatus" to "speech recognition." Then step 586 sets the STRINGEND_POINTER 531 to the last character of text starting at the former CURSOR 312A which matches the former search string. In the example, the CURSOR has just been set back to 312A, and thus step 586 sets STRINGEND to the old STRINGEND 532B. Once this is done, step 589 redisplay the screen 307 so that it shows the portion of text matching the current search string in highlights 534 with the CURSOR 312A blinking.

Then step 590 checks to see if there are any words stored in the alternate choice array. In the present example, as is described above, it is assumed that there is one word, "apparatuses", in the ALTERNATE_CHOICE array. As a result, step 590 displays that words in a pop-up window 398, shown in FIG. 37, under the heading "OR SELECT." Then step 592 performs a test to see if the current search string is empty, as it would be after the user says "scratch-that" when the search string contains only one word. If this test were met, step 592 would make an exit from NEXT_SEARCH_WORD to the top of FIRST_SEARCH_STRING to commence execution of that subroutine as if the user had not yet entered any words into the search string. If, on the other hand, the search string contain one or more words after the user says "scratch-that", step 594 causes the program to jump to the top of the subroutine NEXT_SEARCH_WORD to wait for an addition search word to perform an incremental search on.

Once the functions of step 566 have been completed in the current example and the screen 307 has the appearance shown in FIG. 37, step 594 cause the program to jump to the top of NEXT_SEARCH_WORD, where, after performing steps 552, 556, 560, and 562, the program waits at step 564 for the user to say another utterance, to type a word followed by a return, or to select a number associated with one of the displayed word choices. If the user presses the key of an alternate word choices shown in the pop-up menu 398, step 394 of FIG. 16 causes the word choice corresponding to that key to be stored in RECOGNIZED_WORD, as if it has been said, or typed, by the user. Thus in the example of FIG. 37, if the user types the numeral 1, the word "apparatuses" is to be stored in RECOGNIZED_WORD and is added to the current search string, causing the program to search from the current CURSOR to the end of the file for an occurrence of text matching the string "speech recognition apparatuses." After this is done the user is free to add additional words to the search string, as described above, or exit the "search" command by returning the key 40B to the pause or dictate position.

It can be seen that step 566 of FIG. 29 enables a user to backtrack and correct an incremental search when the voice recognition apparatus mistakenly adds an undesired word to the search string. In addition, its display of alternate word choices from the failed recognition attempt provides the user with an easy way to select between words which the system is likely to confuse.

As was stated with regard to FIG. 11 and 14, COMMAND_MODE enables the user to select other commands besides the "search"command. If the user selects the "upsearch" command, COMMAND_MODE calls the UPSEARCH subroutine shown in FIG. 18. This subroutine is virtually identical to the "search" subroutine except that it sets the parameter SEARCH_DIRECTION to BACK, which cause it to search in the opposite direction, that is, from the current CURSOR location to the beginning of the text file.

Figure 19:
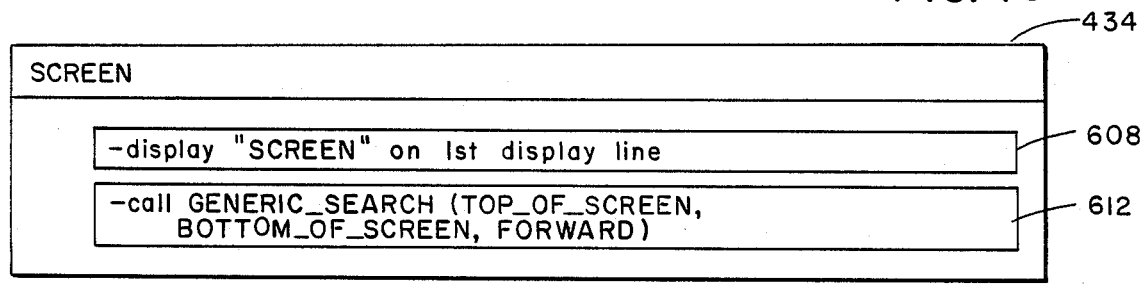

If the operator selects the "screen" command for the COMMAND_MODE, the SCREEN subroutine shown in FIG. 19 is called. This subroutine is similar to the SEARCH subroutine except that it performs its search solely upon the portion of the text currently displayed upon screen 307. This is done in step 612 of FIG. 19 by calling the subroutine GENERIC-SEARCH with the SEARCH_START parameter equal to TOP-OF_SCREEN, which indicates the location in the text file of the first character on screen 307, and with the parameter SEARCH_END equal to BOTTOM_OF_SCREEN, which indicates the location in the text file of the last character on the screen. When the "screen" command is executed, the SEARCH_WORD_LIST and NEXT_WORD_LISTS produced by its calls to FIRST_SEARCH_WORD and NEXT_SEARCH_WORD are very short, and thus they greatly reduce the chance of misrecognition. The "screen" command provides a quick and convenient way for a user to move the CURSOR on the screen.

Figure 20:
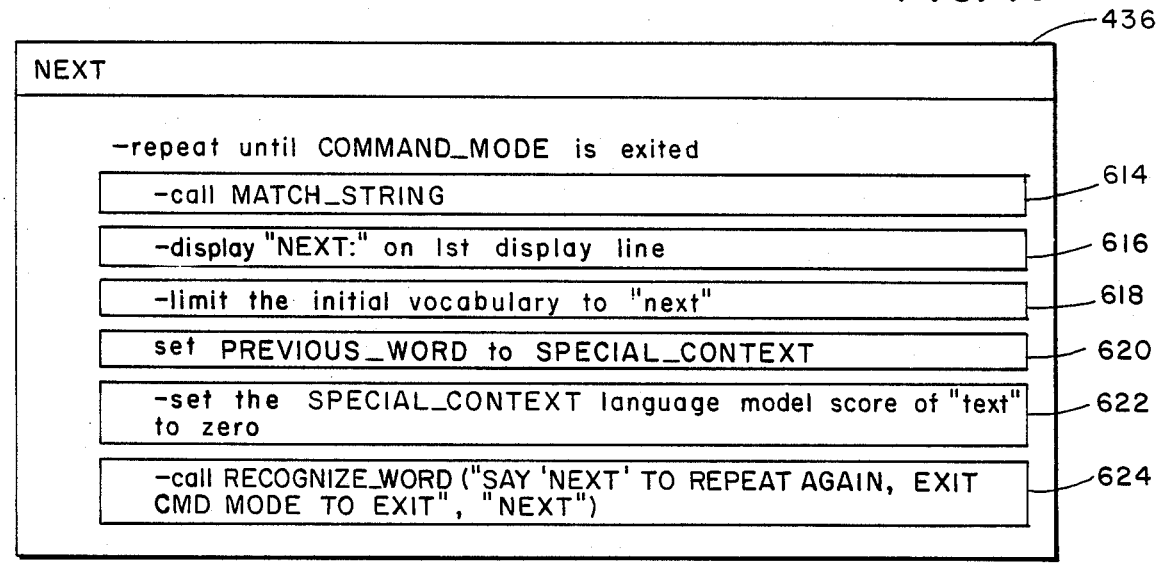

If the user speaks or types "next" in response to the COMMAND_MODE prompt, the subroutine NEXT, shown in FIG. 20, is called. This subroutine is designed to repeat the last text matching command, either "search", "upsearch", or "screen", executed by the user. The NEXT subroutine contains a sequence of steps 614 through 624 which are repeatedly executed until the user exits the COMMAND_MODE by pushing the switch 40B upward. The first of these steps, step 614 calls the subroutine MATCH_STRING, described above with regard to FIG. 32. MATCH_STRING searches in the current SEARCH_DIRECTION from the current CURSOR to the current value of SEARCH_END for the first occurrence of text matching the current search string. When NEXT is first called, the values of SEARCH_DIRECTION and SEARCH_END are those set by the last call to a text matching command, either "search", "upstream", or "screen". If the search step 519 of MATCH_STRING finds text which matches the current search string, CURSOR-POINTER is pointed to the first character, and STRINGEND_POINTER is pointed to the last character, of that matching text, and the screen is redisplayed to show the matching text in highlights. If no matching text is found, "NOT FOUND" is placed on the second prompt line 318, a beep is made, and the program exits to the COMMAND_MODE.

Assuming matching text is found, once the call by step 614 of FIG. 20 to MATCH_STRING is complete, step 616 displays "NEXT:" on the first display line 308, and step 318 limits the intial vocabulary to the single word "next." Then step 620 sets PREVIOUS_WORD to SPECIAL_CONTEXT, and step 622 sets the special context language model score of the word "NEXT" to zero. Then step 624 calls RECOGNIZE_WORD, which waits for the user to state an utterance which is recognized as "next" or to type a sequence of characters followed by a return. As soon as the user does either of these, step 624 is complete and the program returns again to step 614 and again calls the subroutine MATCH_STRING, which searches for the next occurrence of text matching the current search string.

It can be seen that NEXT advances the CURSOR to the next occurrence of the current search string when first entered, and then search again for the next occurrence of the search string every time the user either says the word "next" or types one or more keys followed by a return. This function enables the user to move the CURSOR to successive occurrences of the search string merely by saying the word "next". The combination of the functions "search," "upsearch," and "screen" with "next" enables the user to rapidly locate a given occurrence of a string anywhere to a body of text to be searched.

Figure 21:
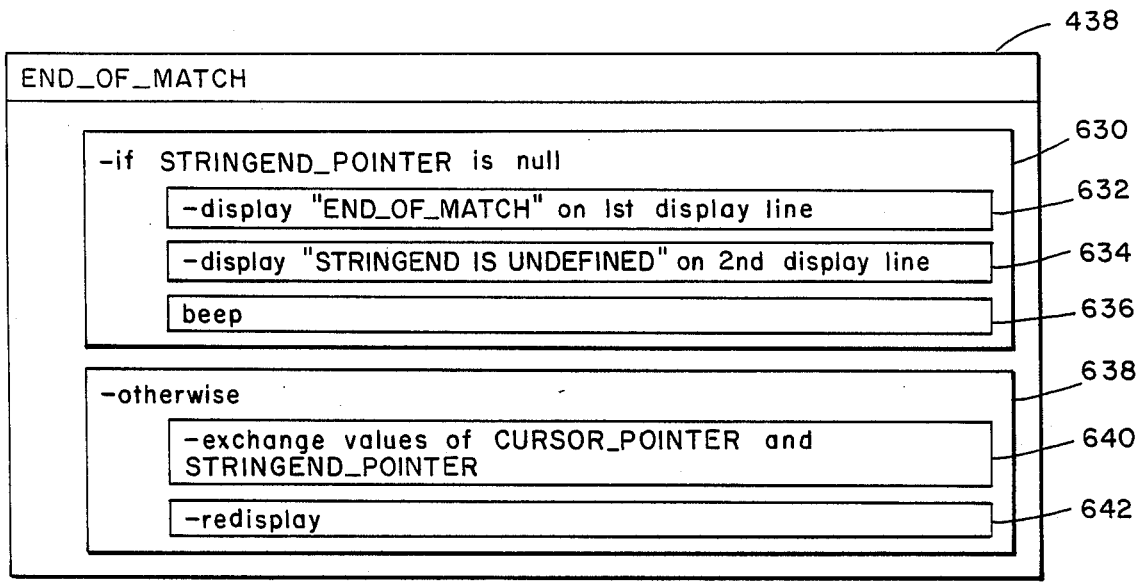
Figure 22:
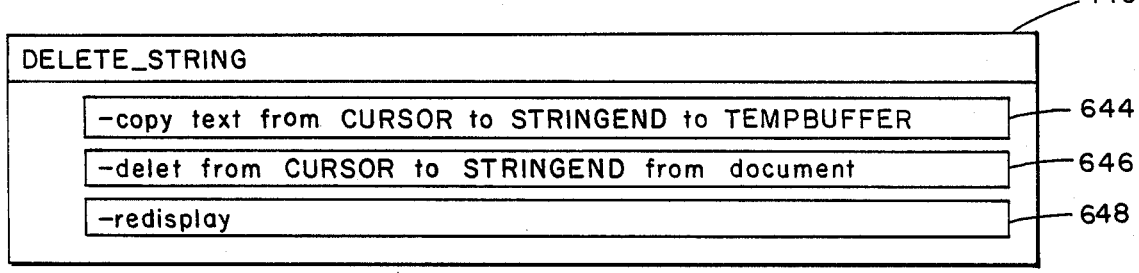

If the user chooses the "end-of-match" command from the COMMAND_MODE, the subroutine END_OF_MATCH shown in FIG. 21 is called. This subroutine performs a check at step 630 to see if the STRINGEND_POINTER is null, meaning that it currently does not point to any position in the text. If so, step 632 prompts that STRINGEND is undefined. If, on the other hand, the STRINGEND_POINTER does point to a location in the text file, step 640 exchanges the CURSOR and the STRINGEND by storing the value formally in the CURSOR-POINTER 459 in the STRINGEND_POINTER 531 and vice versa. Then step 642 redisplays the screen. END_OF_MATCH enables the user to move the CURSOR from the beginning of a portion of text matching the current search string to the end of that portion of text.

If the user selects the "delete-string" command from COMMAND_MODE, the DELETE_STRING subroutine shown in FIG. 2 is called. This function merely copies the text from the CURSOR to the STRINGEND into a temporary buffer in step 644. Then it deletes the text from the CURSOR to the STRINGEND from the document in step 646, which causes both the CURSOR and the STRINGEND to be located at the first character following the deleted text. Then step 648 redisplays the text, with the deleted material absent. DELETE_STRING is similar to delete functions commonly seen in word processing systems, but it is different in that the text it deletes is that which matches a voice defined search string.

Figure 23:
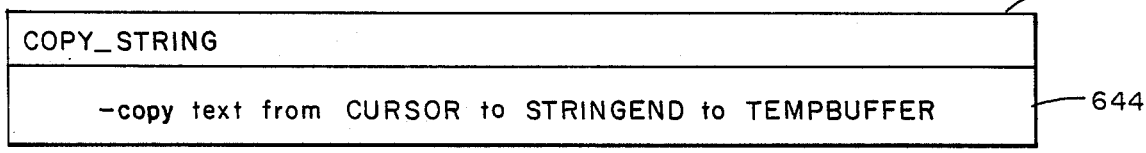

Similarly, if the user selects the "copy-string" command from the COMMAND_MODE, the subroutine 442 of FIG. 23 is called. This subroutine merely performs step 644 described above with regard to FIG. 22. That is, it copies the text from the CURSOR to the STRINGEND into a temporary buffer, so that text can copied to another location by the YANK command.

Figure 24:
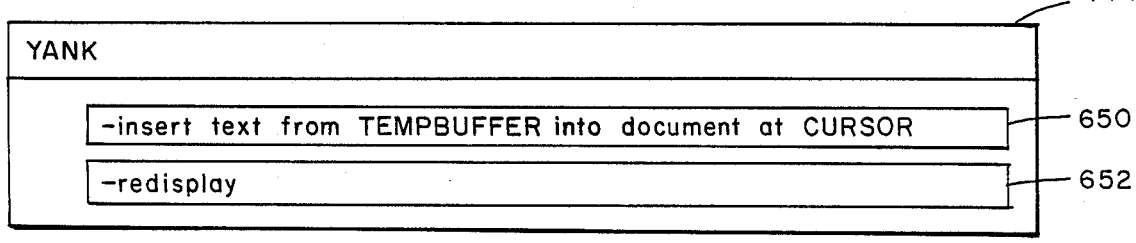

If the user selects the YANK command, the subroutine 444 shown in FIG. 24 is called. Step 650 of this routine inserts text stored in the temporary buffer, either by the DELETE_STRING or COPY-STRING routines, into the current document at the location of the current CURSOR. Once this is done, step 652 redisplays the current screen to show the inserted text.

Thus it can be seen that the "delete-string," "copy-string," and "yank" commands enable a user to delete, copy, or move a sequence of words identified by the speaking of those words in conjunction with either a "search," "upsearch," or "screen" commands. This ability to identify segments of text to be inserted, deleted, or moved by speaking the words of that segment, greatly enhances the ease of editing documents.

Figure 38:
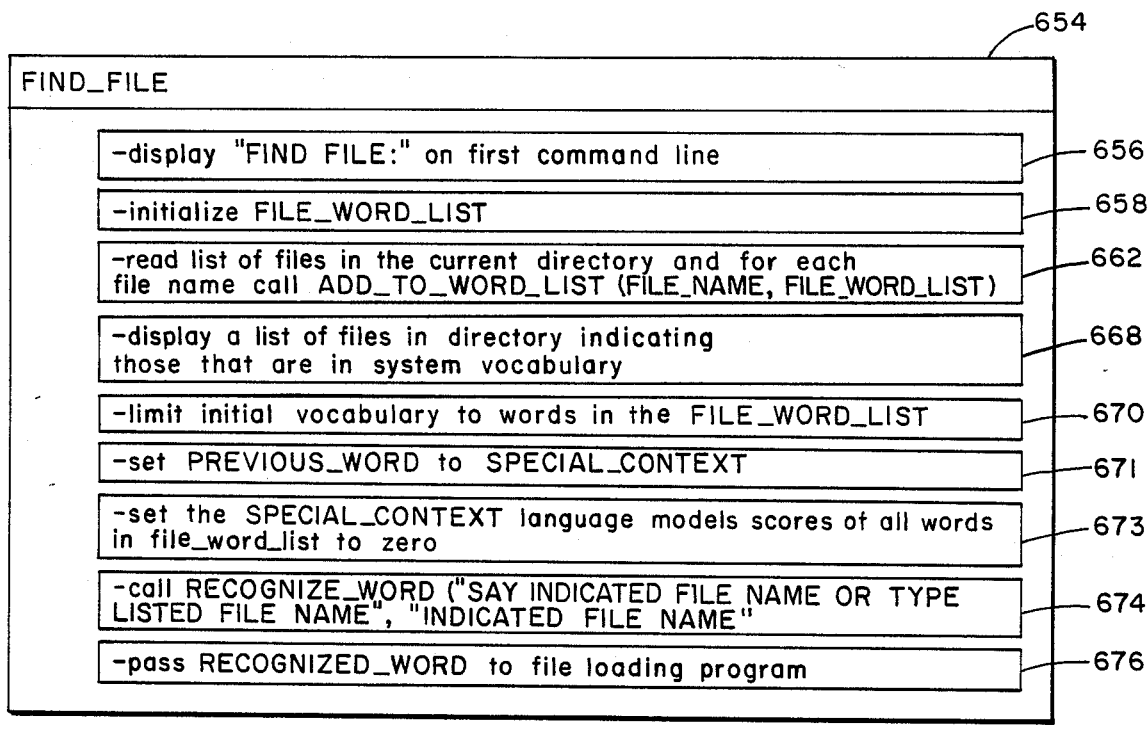
FIG. 38 is a schematic block diagram of the FIND_FILE subroutine which can be selected in the COMMAND_MODE.
Figure 39:
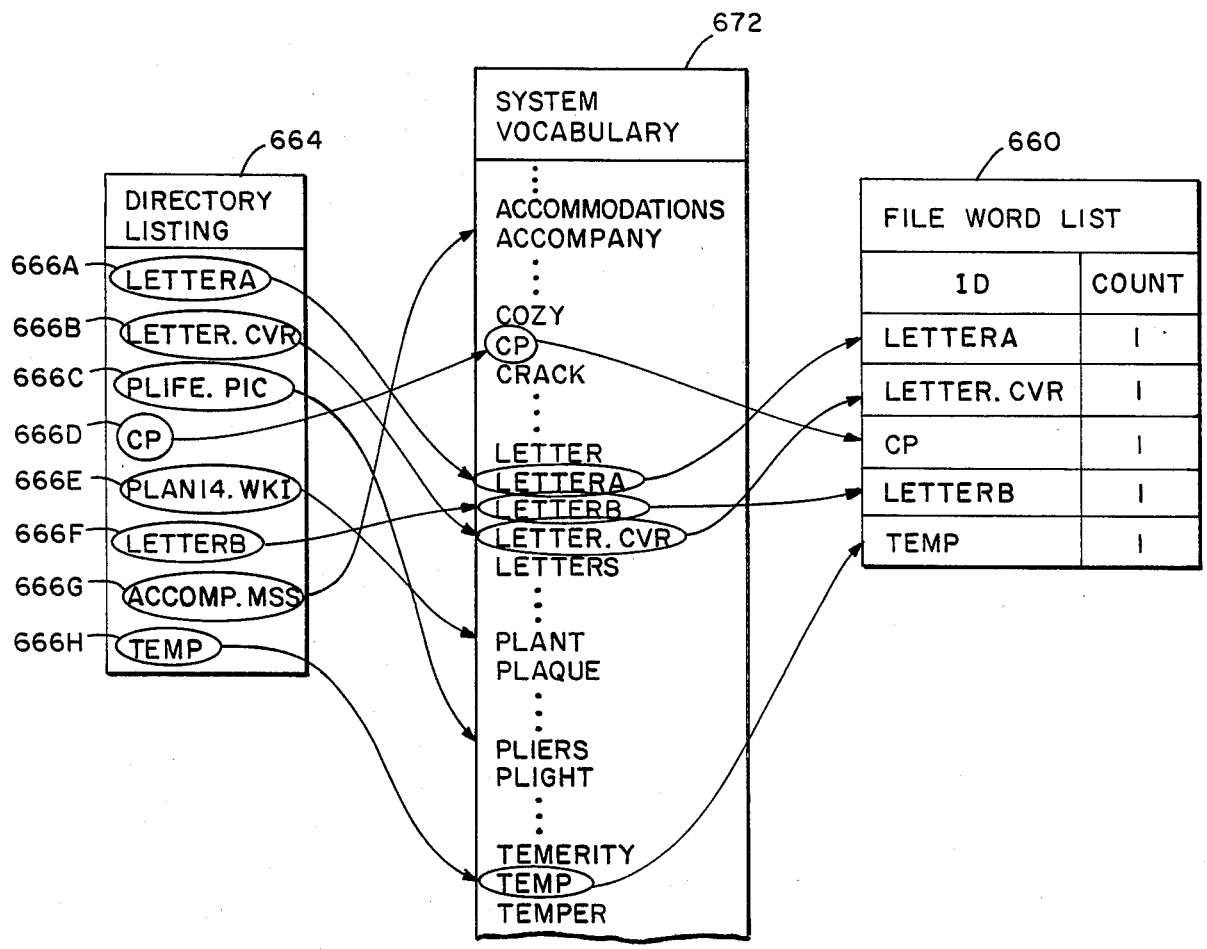
FIG. 39 is a schematic representation of the formation of a FILE_WORD_LIST by the subroutine shown in FIG. 38.

If the user selects the "find-file" command from the COMMAND_MODE, the FIND_FILE subroutine shown in FIG. 38 is called. Its first step, step 656, displays "FIND FILE:" on the first command line 308. Then step 658 obtains and clears memory for a FILE_WORD_LIST 660, shown in FIG. 39. Step 662 reads the directory listing 664, which lists the files contained in the current directory stored on disk 84, shown in FIG. 1. After step 662 obtains the directory listing 664, it calls ADD_TO-WORD_LIST for each of the file names 666A-666H in that listing. As is described above, ADD_TO-WORD_LIST takes each word for which it is called and checks to see if that word is in the system vocabulary, shown as 672 in FIG. 39. If so, it checks if that word is currently in the FILE_WORD_LIST 660, and if not, it adds that word to that word list setting its count to one. If the word is already in the FILE_WORD_LIST 660, it increments that words count. File names are often not standard words, and if they are not standard words they will not belong to the system vocabulary 672 unless the user has specifically entered them into it. This is indicated in FIG. 39 in which the file names 666A, 666B, 666D, 666F, and 666H are shown as belonging in the system vocabulary, but the file names 666C, 666E, and 666G are represented as not belonging to that vocabulary. As can be seen from that FIG., only the file names which occur in the system vocabulary are placed on the file word list 660.

Figure 40:
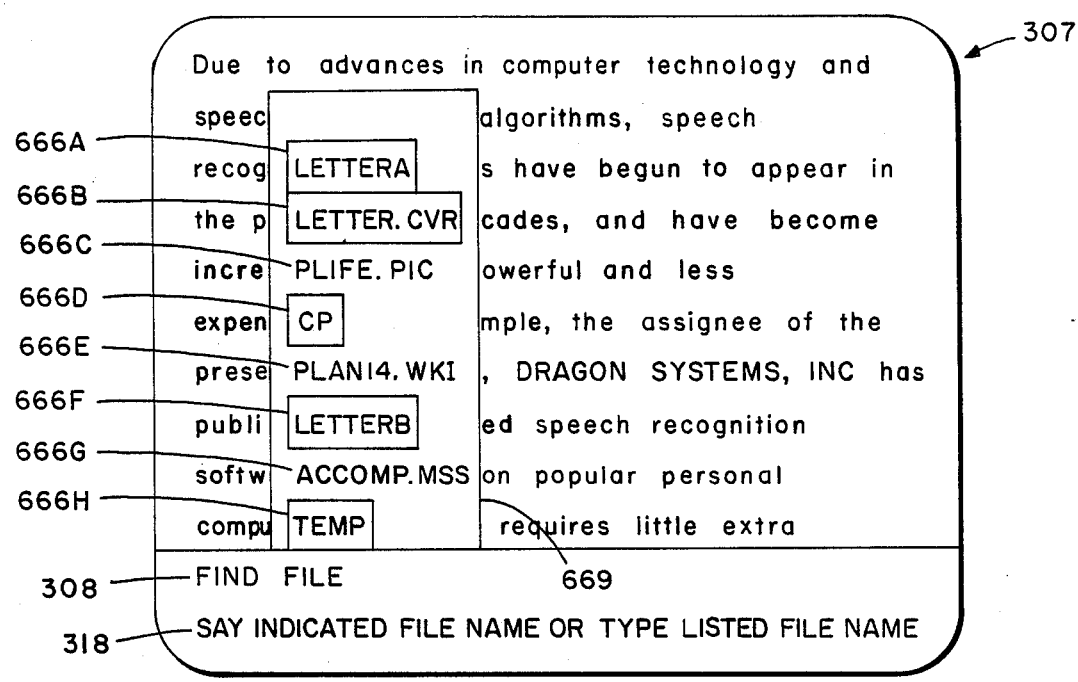
FIG. 40 is a schematic representation of the video display screen produced by the FIND_FILE subroutine.

Once step 662 of FIG. 38 has been completed, step 668 displays a list of the files in the current directory, indicating which of those files are in the system vocabulary. This is indicated by the pop-up menu 669 shown in FIG. 40. This menu lists each of the file names 666A, 666B, 666D, 666F, and 666H which occur in the system vocabulary by using normal video to contrast with the reverse video used for the rest of the menu. Then step 670 limits the initial vocabulary to words in the FILE_WORD_LIST. This greatly reduces the likelihood of misrecognition. Then steps 671 sets PREVIOUS_WORD to SPECIAL_CONTEXT, so that the recognition algorithm shown in FIG. 3 will use the special context language scores shown in the bottom row, $W_{SC}$, of FIG. 15. Once this is done, step 673 sets the special context language model scores for all of the file names occurring in the file-word-list to zero, so they all have an equal probability of being recognized. Then step 674 calls RECOGNIZE_WORD. This subroutine waits until the user either utters a word recognized as one of the file names on the FILE_WORD_LIST or until he types a sequence of characters followed by a RETURN, and then returns with the user's response in RECOGNIZED_WORD. Once this is done, step 676 passes RECOGNIZED_WORD to a file finding program of a type which is common in the computer arts.

Thus it can be seen that FIND_FILE enables a user to use voice recognition to select files, and that limiting of recognizable word to file name occurring in a FILE_WORD_LIST greatly reduces the chance that the recognition algorithm of FIG. 3 will fail to recognize a file name correctly, provided that the file name has been entered into the system vocabulary.

Figure 41:
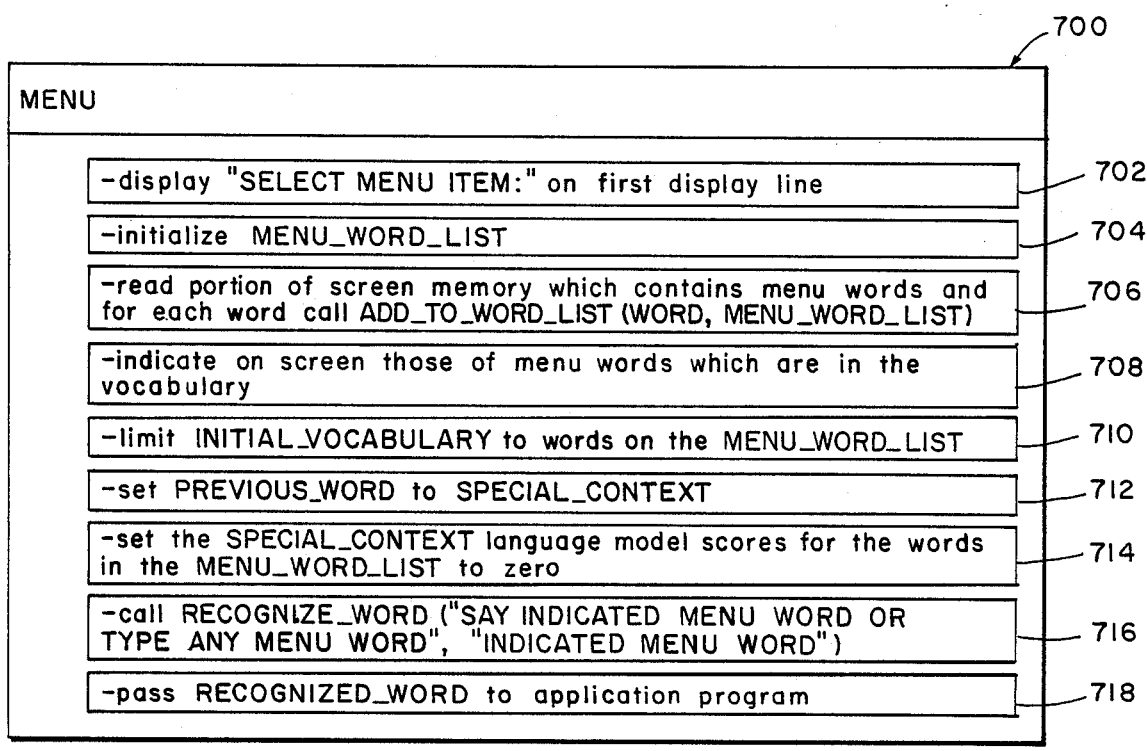
FIG. 41 is a schematic block diagram of a MENU subroutine which displays an additional embodiment of the present invention.

Referring now to FIG. 41, a subroutine MENU is shown. This subroutine is not designed for use with the COMMAND_MODE described above, but instead is designed to be called any time when a menu of choices is displayed to a user. It can be called by the pressing of a keyboard key or by a voice command.

When this subroutine is called, its first function is a step 702 which displays "SELECT MENU ITEM:" on the first display line 308. Step 704 initializes a MENU-WORD_LIST, which is like the FILE_WORD_LIST described above. Then step 706 reads the portion of the screen memory which contains menu words, and, for each word which it finds in that portion, calls ADD_TO-WORD_LIST. In computer programs in which menu words are surrounded by reverse video, step 706 can use an algorithm which reads all of the screen memory bounded by reverse video and calls ADD_TO-WORD_LIST for each word in that portion of memory. If, however, there is no easy way to discern which words in the screen memory are part of menus displays, step 706 can call ADD_TO-WORD_LIST for all words in the current screen memory.

Once step 706 has been performed, the MENU-WORD_LIST contains a list of all the menu words which occur. Once this is done, step 708 indicates on the screen those of the menu words which are in the system vocabulary. For example, this could be done by blinking those words in the menu which occur in the system vocabulary, or by displaying them in normal video if the other menu words are displayed in reverse video.

Next step 710 limits the initial vocabulary to words in the MENU-WORD_LIST. This greatly reduces the number of words avaiable for recognition, and thus greatly reduces the chance that the system will misrecognize a menu word. After this is done, step 712 sets PREVIOUS_WORD to SPECIAL_CONTEXT, so that the language model scores will be drawn from the bottom row, $W_{SC}$ shown in FIG. 15. Then step 714 sets the language model scores in that row for each word in the MENU-WORD_LIST to zero, so they all have an equal chance of being recognized. Then step 716 calls RECOGNIZE_WORD, which waits until the user either says an utterance recognized as a word on the MENU-WORD_LIST or until he types a sequence of characters followed by a RETURN. Then RECOGNIZE_WORD returns with the user's response in the variable RECOGNIZED_WORD, and step 718 passes RECOGNIZED_WORD to the application program, which uses it to select the response indicated by that menu word.

It can be seen that the present invention provides a speech recognition system which improves the ease with which humans can control computer systems, and particularly computer systems which deal with text. The above described invention improves the speed with which a human operator can move a cursor, enabling him to place the cursor at a desired a sequence of one or more words merely by speaking of a few words. It should also be understood that the present system improves the reliability of such voice controlled functions by reading a particular data structure from which spoken words are to be selected and then substantially limiting the recognition vocabulary to words contained in that data structure.

The construction of SEARCH_WORD_LISTS and NEXT_WORD_LISTS by the technique described can be performed rapidly by present personal computers if the text for which such lists are being prepared is relatively short. When the present invention is used with relatively long texts, it will be desirable to maintain a SEARCH_WORD_LIST for the entire documents at all times, and to update that list each time a word is added to, deleted from, or changed in that document. This prevents the need for an entire SEARCH_WORD_LIST to be calculated anew each time a search is started, and thus it avoids the delays which would be associated with such calculation if the text being searched is of any substantial length. It should be understood that as the power of computers grow, particularly as parallel processing becomes more common, the time required to calculate SEARCH_WORD_LISTs and NEXT_WORD_LISTs of the type described above will be greatly reduced. As a result, the desirability of using such calculations to reduce speech recognition errors will become relatively more attractive.

It should be understood that although the described preferred embodiments of the invention all use the speech recognition technique described in Application Ser. No. 797,294, that the basic concepts of the present invention can be used with other speech recognition systems.

In the above described embodiment of the present invention, when the user speaks a search word, the system immediately adds the best scoring vocabulary word to the search string and searches for the next sequence of text matching that string. If the recognition of the search word is incorrect, the user can say "scratch-that", causing the cursor to move back to its location before the search word was recognized and to display the alternate word choices for the word which was mis-recognized. At this time the user can select to have one of the alternate word choices added to the search string. In alternate embodiments, however, the system could display a plurality of the best scoring words produced by the recognition of a spoken search word before conducting the next search. Such as system would require the user to select the best scoring word or one of the alternate word choices for addition to the search string before the next search is performed.

Accordingly, the present invention should not be considered to be limited by the description herein of the preferred embodiment, but rather should be interpreted in accordance with the following claims.

What we claim is:

1. A text locating system comprising:
    means for storing an acoustic description of each of a plurality of vocabulary words;
    means for representing a body of text having a sequence of words, said body of text being other than a list of said vocabulary words;
    means for receiving an acoustic description of one or more utterances to be recognized;
    recognition means for comparing the acoustic descriptions of the utterances to be recognized against acoustic descriptions of a recognition vocabulary comprised of one or more of said vocabulary words to select which of the words in said recognition vocabulary most probably correspond to said one or more utterances;
    search-string means for receiving one or more vocabulary words determined by said recognition means as corresponding to said one or more utterances and for creating a search string out of them;
    matching means for searching at least a portion of said body of text for a sub-sequence of one or more words matching said search string;
    probability altering means for altering the probability that said recognition means will select a given vocabulary word as corresponding to a given utterance as a function of the frequency of occurrence of that vocabulary word in at least a portion of said body of text.

2. A text locating system as described in claim 1 wherein said probability altering means includes means for altering the probability that said recognition means will select a given vocabulary word as corresponding to a given utterance as a function of the frequency of occurrence of that word in the particular portion of text which said matching means searches for a sub-sequence of one or more words matching said search string.

3. A text locating system as described in claim 2 wherein:
    said system further includes:
        a visual display means having a screen for displaying at least a portion of said text on said screen;
        means responsive to said matching means for displaying said matching sub-sequence of one or more words on said screen;
    said probability altering means includes means for altering the probability that said recognition means will select a given vocabulary word as corresponding to a given utterance as a function of whether or not that vocabulary word occurs in the portion of said body of text being displaced on said screen; and
    said machine means includes means for searching said portion of text displayed on said screen for a sub-sequence of one or more words matching said search string.

4. A text locating system as described in claim 1 wherein said probability altering means includes means for substantially limiting said recognition vocabulary to words which are contained in at least a portion of said text which includes the portion of text searched by said matching means.

5. A text locating system as described in claim 1 wherein said probability altering means includes means for altering the relative probability that each of two given words which occur in a portion of said body of text will be selected as corresponding to a given utterance as a function of the relative number of times that each of the two words occurs in said portion of said body of text.

6. A text locating system as described in claim 1 wherein:
    said system further includes cursor storing means for storing the location of a cursor, that is, a movable location in said body of text;
    said search string means includes means for adding each word which it receives from the recognition means to a search string;
    said string means includes means for searching from a current cursor position to one end of a specified portion of said body of text for the first occurrence of a sub-sequence of one or more words matching said search string in response to each addition of a vocabulary word to said search string;
    said system further includes means for setting said location stored in said cursor storing means to point to the sub-sequence of one or more words, if any, found by said string matching means in response to the addition of a word to said search string;
    said probability altering means has matching-context means which include:
    means for finding all sub-sequences of one or more words in the portion of text from the current cursor to said end of a specified portion of text which match the current search string;
    means for finding all of the words which immediately follow those sub-sequences; and
    means for altering the probability that said recognition means will select a given vocabulary word as a function of the frequency of occurrence of that vocabulary word as one of said immediately following words.

7. A text locating system as described in claim 6 wherein said matching-context means includes means for indicating if the sub-sequence of one or more words found to be matching the search string by the matching means is the only sub-sequence of one or more words matching that search string in the portion of text extending from the current cursor to said end of a specified portion of text.

8. A text locating system as described in claim 2 wherein:
    said recognition means includes means for producing a plurality of possible word choices which are considered to be among the vocabulary words most likely to compare to said including:
    said system further includes visual display means for displaying a plurality of said word choices;

said system further includes selection means for enabling a user to select at least one of the displayed word choices for use in said search string; and and said search-string means includes means responsive to said selection means for causing the word choice selected by the user to be use in said search string.

9. A text processing system comprising:

means for representing a body of text having a sequence of characters which form a sequence of words;

means for performing editing functions on said body of text;

means for storing an acoustic description of each of a plurality of vocabulary words;

means for receiving an acoustic description of one or more utterances to be recognized;

recognition means for comparing the acoustic descriptions of the utterances to be recognized against the acoustic descriptions of a recognition vocabulary comprised of one or more of said vocabulary words to select which of the words of said recognition vocabulary most probably correspond to said one or more utterances;

search string means for receiving the one or more vocabulary words determined by said recognition means as corresponding to said one or more utterances and for creating a search string out of them;

matching means for searching at least a portion of said body of text for an occurrence of a subsequence of one or more words matching said search string;

cursor storing means for storing the location of a cursor, that is, a movable location in said body of text at which certain text processing functions can be performed; and cursor setting means, responsive to said string matching means, for setting the location stored in said cursor storing means to one which points to said matching sub-sequence of one or more words.

10. A text processing system as described in claim 9 further including:

dictation-mode means for receiving words recognized by said recognizing means and for causing them to be inserted into said body of text at the location stored in said cursor storing means;

mode changing means, controllable by a human operator, for causing said text processing system to switch between a dictation-mode, in which words recognized by said recognition means are inserted into said body of text by said dictation-mode means, and a search mode, in which words recognized by said recognition means are used to change the location stored in said cursor storage means by the collective operation of said search string, string matching, and cursor setting means.

11. A text processing system as described in claim 9 further including:

old cursor storing means for storing a former location of said cursor;

means for having the cursor location stored in said cursor storing means before that cursor location is changed by said cursor setting means in response to the operation of said string matching means, and for storing that saved cursor location in said old cursor storing means;

means, controllable by a human operator, for placing the location stored in the old cursor storing means back in the cursor storing means.

12. A text processing system as described in claim 9 wherein said cursor setting means includes means for setting the location stored in said cursor storing means to point at the beginning of said sub-sequence one or more of words found to match said search string by said matching means.

13. A text processing system as described in claim 12 further including means, responsive to a command from a human operator, for setting the location stored in the cursor storing means to point at the end of said matching sub-sequence of one or more words.

14. A text processing system comprising:

means for representing a body of text having a sequence of characters which form a sequence of words;

means for performing editing functions on said body of text;

means for storing an acoustic description of each of a plurality of vocabulary words;

means for receiving an acoustic description of one or more utterances to be recognized;

recognition means for comparing the acoustic descriptions of the utterances to be recognized against the acoustic descriptions of a recognition vocabulary comprised of one or more of said vocabulary words to select which of the words of said recognition vocabulary most probably correspond to said one or more utterances;

search-string means for receiving the one or more vocabulary words determined by said recognition means as corresponding to said one or more utterances and for creating a search string out of them;

matching means for searching at least a portion of said body of text for an occurrence of a subsequence of one or more words matching said search string;

block function means for performing a block function on a block of characters from said body of text; and means for causing said block function means to perform a block function on a block of characters defined by said matching sub-sequence of one or more words.

15. A computer system comprising:

means for storing an acoustic description of each of a plurality of vocabulary words;

means for receiving an acoustic description of one or more utterances to be recognized;

recognition means for comparing the acoustic descriptions of utterances to be recognized against the acoustic descriptions of a recognition vocabulary comprised of one or more of said vocabulary words to select which of the words in said recognition vocabulary most probably corresponds to said one or more utterances;

a data structure representing one or more words, said data structure being other than a list of said vocabulary words;

means for using said data structure for a purpose independent both of indicating which words are vocabulary words and of indicating the probability that individual vocabulary words will be recognized as corresponding to a given utterance;

probability altering means for determining which of said vocabulary words are represented by said data structure and for using that determination to alter the probability that each of said vocabulary words will be selected as corresponding to a given utterance.

16. A computer system as described in claim 15 wherein said probability altering means includes means for substantially limiting the words contained in said recognition vocabulary to words determined by said probability altering means to be represented by said data structure.

17. A computer system as described in claim 15 wherein said probability altering means includes means for altering the relative probability that each of two given words which are represented in the data structure will be elected as corresponding to a given utterance as a function of the relative number of times that each of the two words is represented as occurring in said data structure.

18. A computer system as described in claim 15 further including means for indicating to a user when a word represented by said data structure is a word for which an acoustic description is stored by said means for storing.

19. A computer system as described in claim 15 wherein:
said data structure is a directory of files; and
said means for using said data structure includes means for using said data structure to perform functions on files in said directory.

20. A computer system as described in claim 15 wherein said data structure contains a list of words representing options which the operator of the computer system can choose between.

21. A computer system as described in claim 15 wherein said data structure represents a body of text.

22. A computer system as described in claim 15 wherein:
said system includes a visual display screen; and
said data structure represents the characters which are currently being displayed on said screen.

23. A text locating system for locating a sequence of one or more words in a body of text comprising:
means for representing a body of human readable text as a sequence of individual machine readable characters corresponding to individual human readable characters in that text;
speech recognition means for responding to the sound of a spoken word by producing a word symbol, identifying a human speakable word which said speech recognition means considers likely to correspond to said sound;
search string means for representing a search string comprised of one or more machine readable characters and for responding to the word symbol produced by said speech recognition means by adding to said speech string a sequence of one or more of said machine readable characters corresponding to the spelling of the human speakable word identified by said word symbol; and
string searching means for performing a character-by-character search of least a portion of said body of text for a sub-sequence of one or more of said machine readable characters matching the machine readable characters represented by said search string.

24. A text locating system as described in claim 23 further including means for performing editing functions on said body of text.

25. A text locating system as described in claim 23 further including:
cursor storing means for storing the location of a cursor, that is, a movable location in said body of text at which certain text processing functions can be performed; and
cursor setting means, responsive to said string matching means, for setting the location stored in said cursor storing means to one which points to said matching sub-sequence of one or more words.

26. A text locating system as described in claim 23 further including:
visual display means for displaying at least a portion of said text;
means responsive to said string searching means for displaying on said display a portion of said text containing said matching sub-sequence of one or more words and for indicating where in said portion of text said sub-sequence occurs.

27. A text processing system as described in claim 23 further including:
visual display means for displaying at least a portion of said text; and
means for causing said visual display means to display a portion of text containing said matching sub-sequence of one or more words and to indicate which characters in that portion of text belong to that sub-sequence.

28. A text processing system as described in claim 23 wherein:
said system further includes cursor storing means for storing a cursor, that is, a movable location in said body of text;
said speech recognition means includes means for producing successive word symbols in reponse to the speaking of successive words, each word symbol identifying a human speakable word which said speech recognition means considers likely to correspond to the sound produced by the speaking of a successive word;
said search string means includes means for responding to successive word symbols produced by said speech recognition means by adding the sequence of one or more machine readable characters corresponding to the spelling of the words identified by each successive word symbol;
said string searching means includes means for searching from a current cursor position to one end of a specified portion of said body of text for the first sub-sequence of one or more words matching said search string in response to each addition of a word to said search string; and
said system further includes means for setting the location stored in said cursor storing means to point to the sub-sequence of one or more words, if any, found by said matching means in response to the addition of a word to said search string.

* * * * *